(12) United States Patent
Okeya

(10) Patent No.: US 7,769,539 B2
(45) Date of Patent: Aug. 3, 2010

(54) BEARING CALCULATOR AND ERROR CORRECTION METHOD

(75) Inventor: Shigeo Okeya, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 672 days.

(21) Appl. No.: 10/599,536

(22) PCT Filed: Mar. 31, 2005

(86) PCT No.: PCT/JP2005/006333

§ 371 (c)(1),
(2), (4) Date: Jul. 30, 2007

(87) PCT Pub. No.: WO2005/095890

PCT Pub. Date: Oct. 13, 2005

(65) Prior Publication Data

US 2008/0051987 A1    Feb. 28, 2008

(30) Foreign Application Priority Data

Mar. 31, 2004    (JP) .............................. 2004-107771

(51) Int. Cl.
*G01C 17/38* (2006.01)
(52) U.S. Cl. .................. 701/207; 702/93; 73/1.76; 33/356
(58) Field of Classification Search ................. 701/207
See application file for complete search history.

(56) References Cited

U.S. PATENT DOCUMENTS

| | | | | |
|---|---|---|---|---|
| 4,497,034 A | * | 1/1985 | Kuno et al. ................ | 702/92 |
| 4,660,161 A | * | 4/1987 | Okada ......................... | 702/92 |
| 5,251,139 A | * | 10/1993 | Takano et al. ............... | 701/221 |
| 6,069,585 A | * | 5/2000 | Lanciaux ..................... | 342/443 |
| 7,197,343 B2 | | 3/2007 | Sato | |
| 7,266,452 B2 | * | 9/2007 | Ockerse et al. .............. | 701/224 |
| 7,379,814 B2 | * | 5/2008 | Ockerse et al. .............. | 701/224 |
| 2003/0013507 A1 | * | 1/2003 | Sato ........................... | 455/575 |
| 2004/0254727 A1 | * | 12/2004 | Ockerse et al. .............. | 701/224 |
| 2006/0021238 A1 | * | 2/2006 | Sato et al. ..................... | 33/356 |
| 2007/0124076 A1 | * | 5/2007 | Ockerse et al. .............. | 701/224 |
| 2007/0288166 A1 | * | 12/2007 | Ockerse et al. .............. | 701/224 |
| 2008/0180282 A1 | * | 7/2008 | Brosius ................ | 340/995.27 |

FOREIGN PATENT DOCUMENTS

| | | |
|---|---|---|
| EP | 0539145 A1 | 4/1993 |
| JP | 63030714 A | 2/1988 |
| JP | 05113342 A | 5/1993 |
| JP | 08105745 A | 4/1996 |
| JP | 10-197258 | 7/1998 |

(Continued)

*Primary Examiner*—Thomas G Black
*Assistant Examiner*—Shelley Chen
(74) *Attorney, Agent, or Firm*—Hogan Lovells US LLP

(57) ABSTRACT

A bearing calculator provided with a geomagnetic sensor for detecting earth-geomagnetism and a control unit for calculating a geographical bearing based on detection values of the geomagnetic sensor. The control unit can execute offset error correction processing for correcting the offset error to the geomagnetic sensor based on a change in the magnetic field inside the bearing calculator. When detection values of the geomagnetic sensor enter an abnormal state, it performs said offset error correction processing when the abnormal state continues for a predetermined time, while does not perform the offset error correction processing when the abnormal state ends within a predetermined time.

9 Claims, 32 Drawing Sheets

FOREIGN PATENT DOCUMENTS

| | | |
|---|---|---|
| JP | 2002098536 A | 4/2002 |
| JP | 2002-328042 | 11/2002 |
| JP | 2003090726 A | 3/2003 |
| JP | 2004-028837 | 1/2004 |
| KR | 20030007102 A | 1/2003 |

* cited by examiner

FIG. 13

| EVENT | GEOMAGNETIC SENSOR CORRECTION VALUES | | |
|---|---|---|---|
| | X-AXIS | Y-AXIS | Z-AXIS |
| COMMUNICATION PROCESSING | -1 | 0 | -1 |
| AUDIO OUTPUT PROCESSING | -1 | 0 | 0 |
| TURN ON BACK LIGHT (LOW) | -1 | 0 | -1 |
| TURN ON BACK LIGHT (MEDIUM) | -2 | 0 | 1 |
| TURN ON BACK LIGHT (HIGH) | -3 | 1 | 1 |

BEARING CALCULATOR AND ERROR CORRECTION METHOD

TECHNICAL FIELD

The present invention relates to a movable communication apparatus such as a mobile phone provided with a geomagnetic sensor for measuring the geographical bearing and a method for correcting the geomagnetic sensor.

BACKGROUND ART

Conventionally, there has been a demand for a device to confirm the geographical location of a present position and provide guidance on the route to a target position by a map. As a device satisfying such demand, car navigation systems are known (for example Patent Document 1, Patent Document 2, and Patent Document 3).

In general, a car navigation system calculates the geographical location of the present position by receiving and processing signals transmitted from a plurality of GPS (global positioning system) satellites (hereinafter described as "GPS signals"), reads out map data on the surroundings of this present position from a database stored in a storage unit (DVD, hard disc, etc.) in the system, and displays it on a display. Further, a path of movement of a vehicle is calculated by using a car speed sensor and a gyro sensor, map matching processing for detecting a degree of coincidence between this and a road on the map is carried out, and error of the position finding is corrected.

However, there is a demand for a user to determine his own location and learn the route up to the target position even when he is not in a vehicle. As a device satisfying such a demand, a mobile cellular phone mounting a simple map information display processing function has appeared.

Initially, mobile cellular phones equipped with map information display processing functions lacked a device for measuring the bearing, therefore a map display easily understood by the user such as a heading up display (display rotating the map so that an advancing direction was directed toward the top of a screen) which was generally performed in a car navigation system was difficult.

Therefore, in recent years, a mobile cellular phone equipped with a map information display processing function measuring the bearing by using a geomagnetic sensor and enabling heading up display has been proposed.

Patent Document 1: Japanese Patent Publication (A) No. 2004-28837
Patent Document 2: Japanese Patent Publication (A) No. 2002-328042
Patent Document 3: Japanese Patent Publication (A) No. 10-197258

DISCLOSURE OF THE INVENTION

Problem to be Solved by the Invention

However, a geomagnetic sensor, which detects very weak earth-geomagnetism, is influenced by the magnetic fields generated by a variety of parts in a mobile cellular phone or other communication apparatus and easily suffers from error. In particular, the recent movable and portable cellular phones are being made smaller in size. Sufficient distance between parts is becoming harder to secure. Therefore, the error of detection of the earth-geomagnetism due to the magnetic fields generated from parts in the communication apparatus has become a non-negligible level. For this reason, in a mobile cellular phone to/from which for example a memory card can be attached/detached and further configured so that a read/write operation is possible, there is the problem that the results of calculation of the bearing become different between a state where the memory card is loaded and a state where it is not loaded.

On the other hand, among the recent movable and portable cellular phones, along with the enlargement of the display screens, many devices have appeared with the display unit and key input unit provided in different cases. This type of cellular phone is generally used in a state where the two housings are superposed over each other by folding and the key input unit is hidden inside the cases (closed state) or a state where both of the key input unit and the display unit are exposed (open state).

This two-case type cellular phone includes a type in which the display unit is hidden inside the cases in the closed state and a type in which the display unit is exposed at the outside of the cases as it is. A representative example of the latter type includes a type where the surface of the display unit and the surface of the key input unit are rotated relative to each other in an almost parallel state.

In this way, in a cellular phone of a type able to use the display unit in both of the open state and the closed state, it is desired to use the map information display processing function in both of the two states. However, when the open/closed state of cases is changed, the magnetic field surrounding the geomagnetic sensor changes, therefore there is the problem that the results of measurement of the bearing become different.

Further, in a mobile cellular phone, due to restrictions on the size and cost, it is difficult to correct the measurement error of the bearing by using a detection method other than a geomagnetic sensor, for example, detection of a direction of movement using a gyro sensor in a car navigation system.

The present invention was made in consideration with such circumstances and has as an object thereof to provide A bearing calculator able to find a bearing with a high precision by using a geomagnetic sensor and able to correct offset due to a change in magnetic field.

Another object of the present invention is to provide an error correction method enabling the correction of offset due to a change in magnetic field.

Means for Solving the Invention

According to the present invention, there is provided a bearing calculator provided with a geomagnetic sensor for detecting earth-geomagnetism and a control unit for calculating a geographical bearing based on detection values of the geomagnetic sensor, wherein the control unit can execute a offset error correction processing for correcting offset error to the geomagnetic sensor due to a change of magnetic field in the bearing calculator and, when detection values of the geomagnetic sensor become abnormal state, performs the offset error correction processing if the abnormal state continues for a predetermined time, and does not perform the offset error correction processing if the abnormal state ends within a predetermined time.

Further, according to the present invention, there is provided an error correction method in a bearing calculator provided with a geomagnetic sensor for detecting earth-geomagnetism and a control unit for calculating a geographical bearing based on detection values of the geomagnetic sensor, comprising an offset error correction processing step of correcting an offset error to the geomagnetic sensor due to a change of magnetic field in the bearing calculator; an abnormal state detection step of detecting that detection values of the geomagnetic sensor become abnormal; and a judgment step of judging whether or not an abnormal state continues for a predetermined time when the abnormal state is detected at the abnormal state detection step, said offset error correction processing step is carried out when it is judged in said judgment step that said abnormal state continues for a predetermined time, while said offset error correction processing step is not carried out when it is judged that said abnormal state does not continue for said predetermined time.

Effect of the Invention

According to the present invention, the bearing is found with a high precision by using a geomagnetic sensor, and offset due to a change in magnetic field can be corrected.

BRIEF DESCRIPTION OF THE DRAWINGS

FIG. 13 is a diagram showing an example of correction data;

DESCRIPTION OF NOTATIONS

2 . . . first housing, 3 . . . second housing, 4 . . . mobile mechanism, 21 . . . display panel, 100 . . . mobile cellular phone, 200 . . . GPS satellite, 300 . . . base station, 401 . . . GPS server system, 402 . . . navigation server system, 150 . . . wireless communication unit, 151 . . . GPS signal receiver, 152 . . . storage unit, 153 . . . open/close judgment unit, 154 . . . key input unit, 155 . . . audio processing unit, 157 . . . image capture unit, 158 . . . geomagnetic sensor, 159 . . . memory card unit, 160 . . . control unit.

BEST MODE FOR WORKING THE INVENTION

Below, an embodiment of a case where the present invention is applied to a multi-function type movable and portable cellular phone having a map information display processing function and image capturing function and able to display map information considering the bearing (hereinafter referred to as a "mobile cellular phone") will be explained with reference to the drawings.

Figure 1:
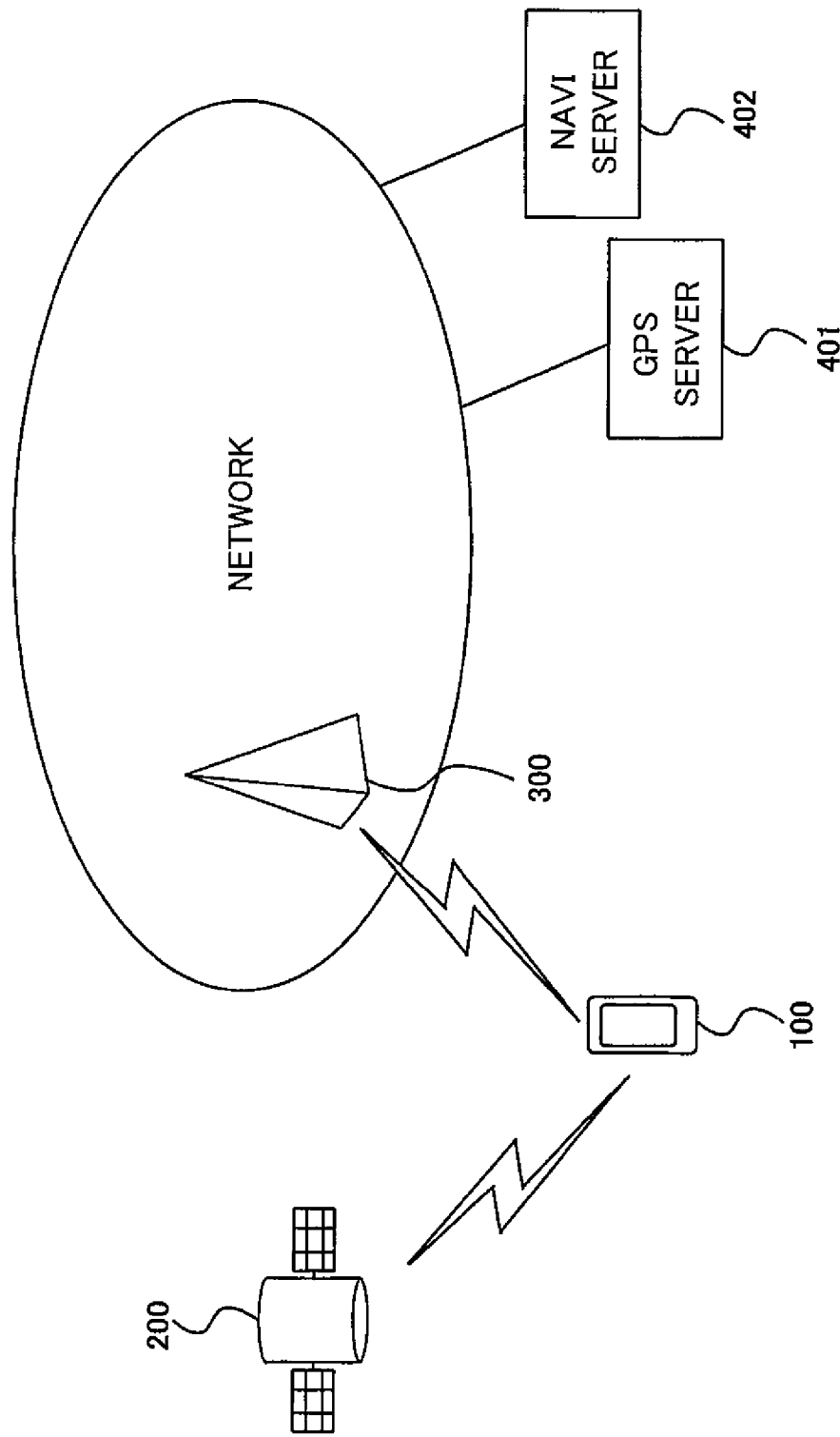
FIG. 1 is a block diagram showing an example of the configuration of a system for acquiring geographical location and information of a map in a mobile cellular phone according to an embodiment of the present invention.

FIG. 1 is a block diagram showing an example of the configuration of a system for acquiring a geographical location and map information in a cellular phone 100 according to an embodiment of the present invention.

The cellular phone 100 receives GPS signals transmitted from three or more GPS use satellites 200 circling the globe on known orbits. Then, the cellular phone 100 transmits the information concerning the received GPS signals from a base station 300 through a communication network to a GPS server system 401, as one example of the position finding means of the present invention, and acquires the location information of the present position from the GPS server system 401.

Further, the cellular phone 100 transmits the location information of the present position acquired from the GPS server system 401 from the base station 300 through the communication network to the navigation server system 402, as one example of the position finding means of the present invention, and acquires the map information on the surroundings of the present position from the navigation server system 402.

The GPS server system 401, as one example of the position finding means of the present invention, calculates the geographical location (for example latitude and longitude) of the cellular phone 100 based on the GPS signals sent from the cellular phone 100 via the communication network and transmits the calculated location information through the communication network and the base station 300 to the cellular phone 100.

The navigation server system 402, as one example of the position finding means of the present invention, retrieves the map information on the surroundings of the cellular phone 100 from a not shown database based on the map information sent from the cellular phone 100 via the communication network and transmits the retrieved map information through the communication network and the base station 300 to the cellular phone 100.

Figure 2:
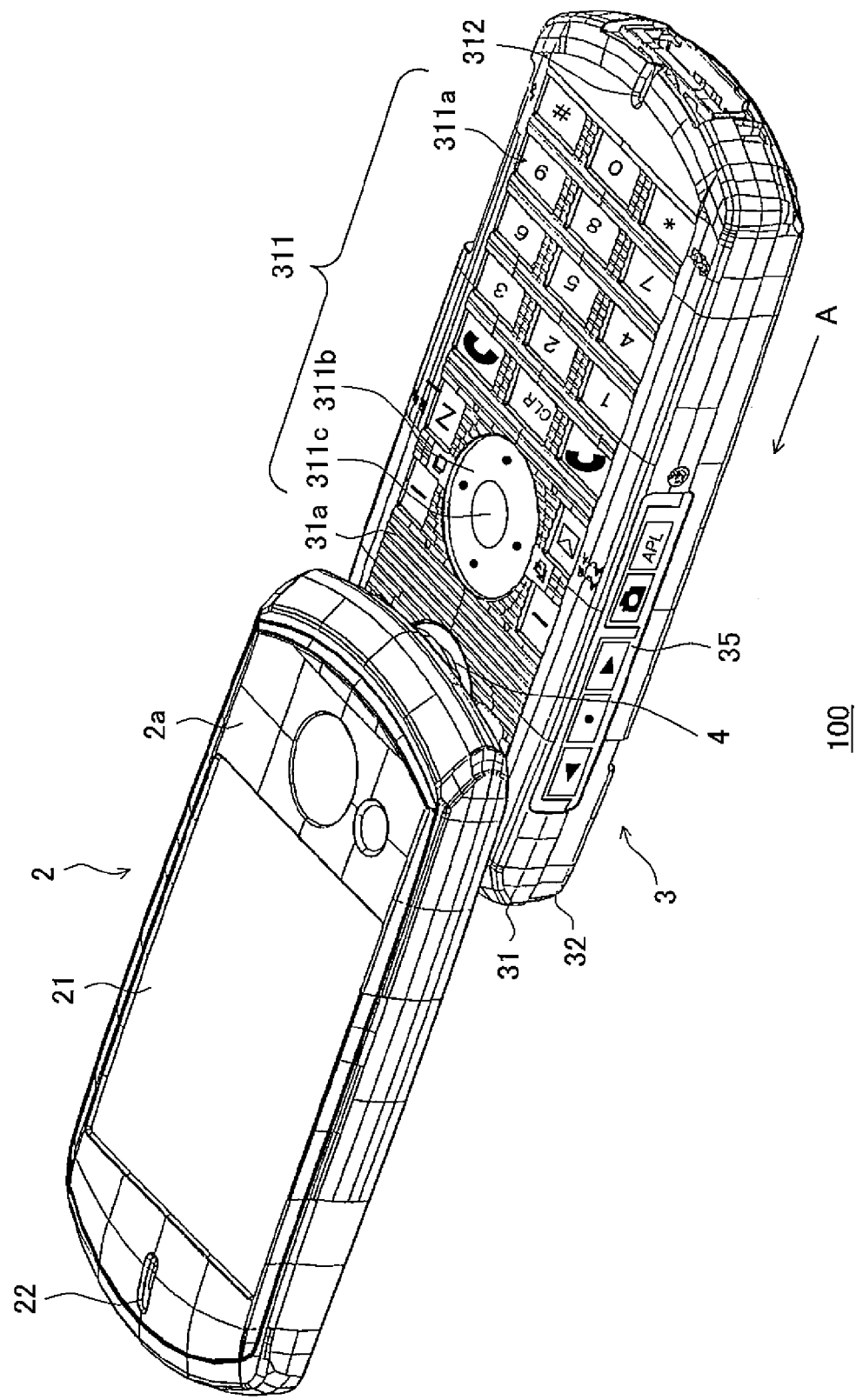
FIG. 2 is a perspective view of a mobile cellular phone in an open state.
Figure 3:
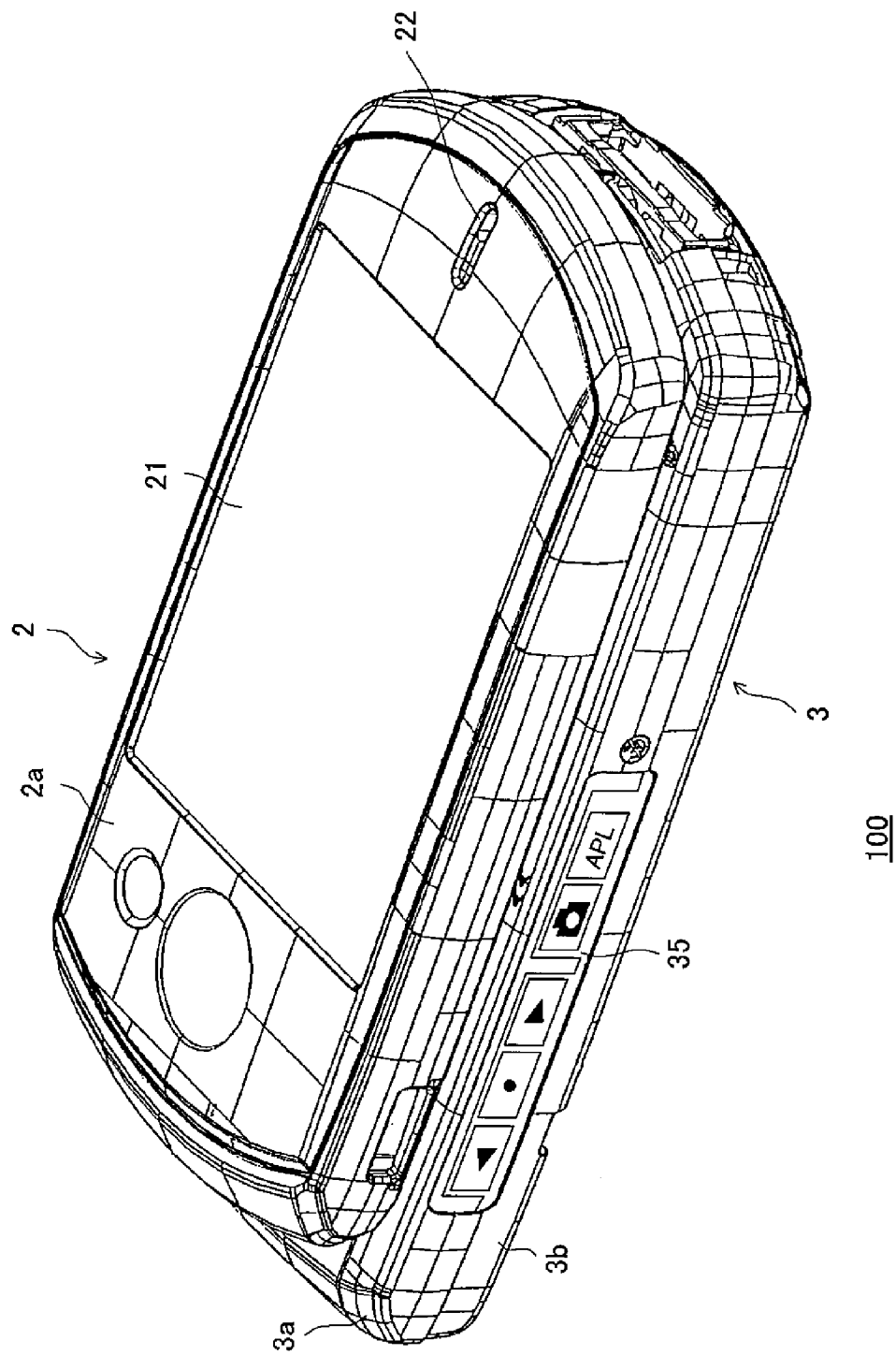
FIG. 3 is a perspective view from one side surface of the mobile cellular phone in a closed state.
Figure 4:
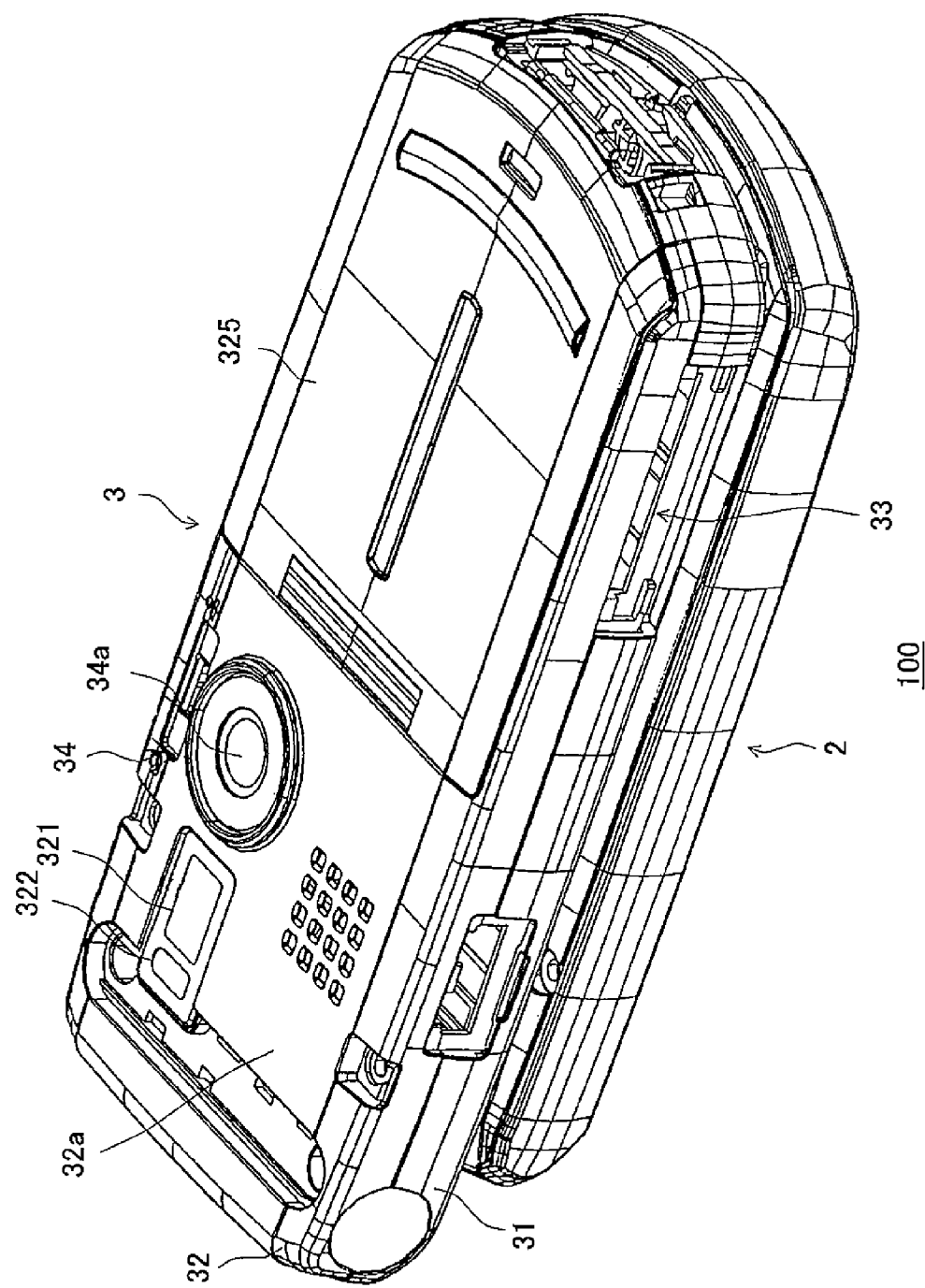
FIG. 4 is a perspective view from the other side surface of the mobile cellular phone in the closed state.

FIG. 2 to FIG. 4 are diagrams showing an example of the appearance of the cellular phone 100.

FIG. 2 is a perspective view of the cellular phone 100 in the open state, FIG. 3 is a perspective view from one side surface of the cellular phone 100 in the closed state, and FIG. 4 is a perspective view from another side surface of the cellular phone 100 in the closed state.

In the cellular phone 100, a first housing (upper housing) 2 and a second housing (lower housing) 3 are connected via a movable mechanism unit 4 so that they can freely open/close and/or freely rotate.

The movable mechanism unit 4 is configured so that it can relatively rotate the first housing 2 and the second housing 3 and/or open/close them about a predetermined rotation axis.

In the first housing 2, a first surface 2a exposed irrespective of the operation state (open state, closed state) of the movable mechanism unit 4 is provided with a display panel 21 configured by for example an LCD (liquid crystal display) panel or organic EL (electroluminescent) display panel. At the left side corner in FIG. 2 of this display panel 21, a speaker 22 is built in.

The display panel 21 is included in a display unit 155 explained later. The speaker 22 is included in an audio processing unit 156 explained later.

The second housing 3 is configured by superimposing a board mounting housing 31 having a board mounted therein and a lid side housing 32 forming the lid of the board mounting housing 31 on each other.

On an outer flat surface 31a of the board mounting housing 31 of the second housing 3, that is, the surface 31a facing one surface of the first housing 2 at the time of the closed state, operation keys 311 including tenkey buttons 311a, cursor buttons 311b, and an enter key 311c are arranged. At the right side corner in FIG. 2 of the operation keys 311, a microphone 312 is built in.

The operation keys 311 are included in a key input unit 154 explained later. The microphone 312 is included in the audio processing unit 156 explained later.

On an outer flat surface 32a exposed irrespective of the open state or closed state of the lid side housing 32 of the second housing 3, as shown in FIG. 4, an optical system 34a of a camera module 34 is arranged.

On the outer flat surface 32a of the lid side housing 32 of the second housing 3, a light emitting window 321 for emitting a flash by a built-in flash lamp to the outside and a light emitting window 322 for emitting white light for assisting image capture at the time of taking a photograph etc. are arranged.

The camera module 34 is included in an image capturing unit 157 explained later.

Camera module use tact switches 35 are arranged at one side of the second housing 3, while a memory card use slot 33 for inserting a memory card is formed at the other side of the second housing 3.

Figure 5:
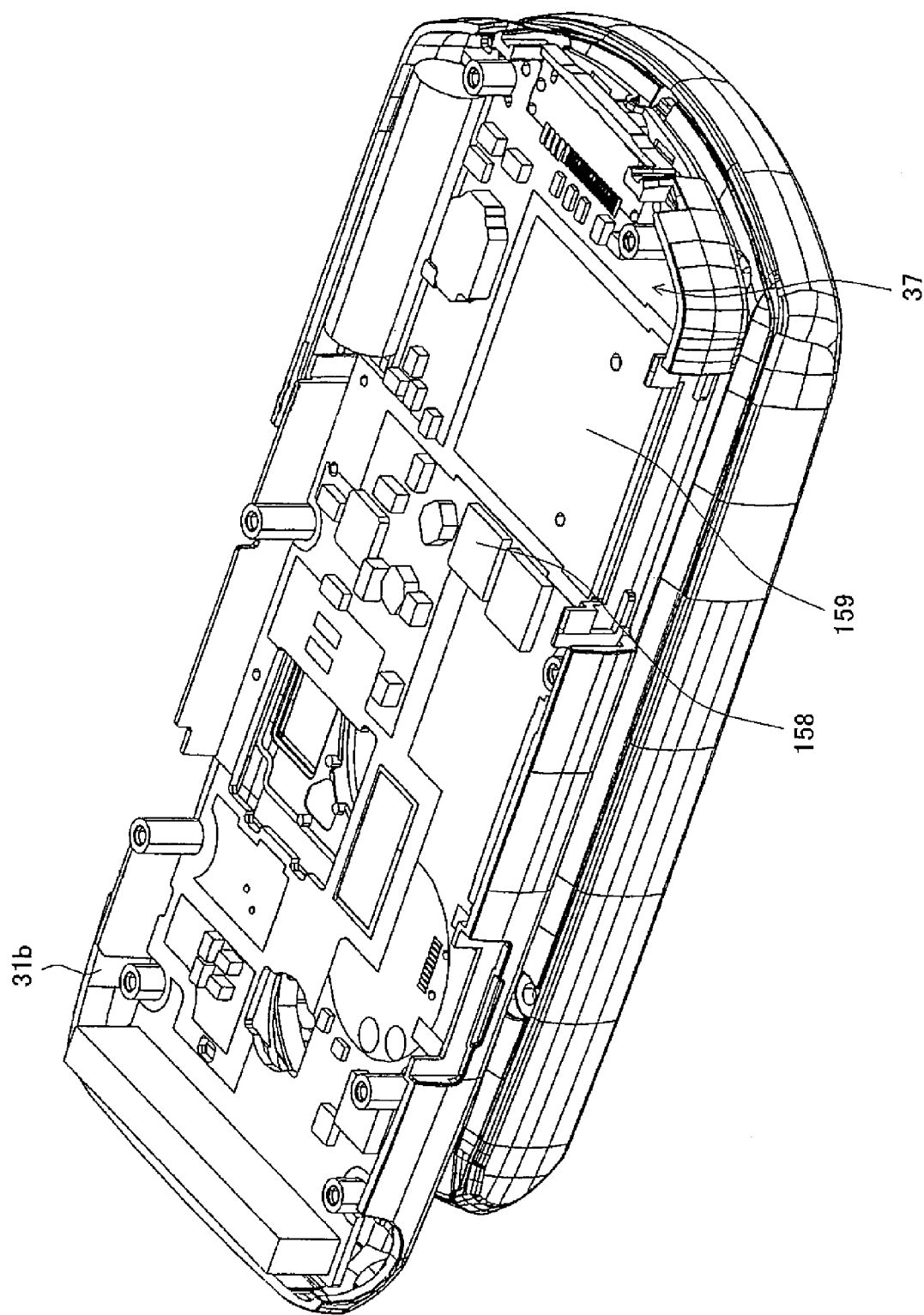
FIG. 5 is a perspective view showing a board mounted state inside a board mounting case.

FIG. 5 is a perspective view showing a board mounted state in an inside 31b of the board mounting housing 31.

In the inside 31b of the board mounting housing 31, a main board 37 is mounted over its bottom surface.

At a location facing the memory card use slot 33 on the main board 37, a memory card unit 159 to which a detachable memory card may be attached is mounted.

At the substantial center position of the main board 37 adjacent to this memory card unit 159, a geomagnetic sensor 158 is mounted.

Figure 6:
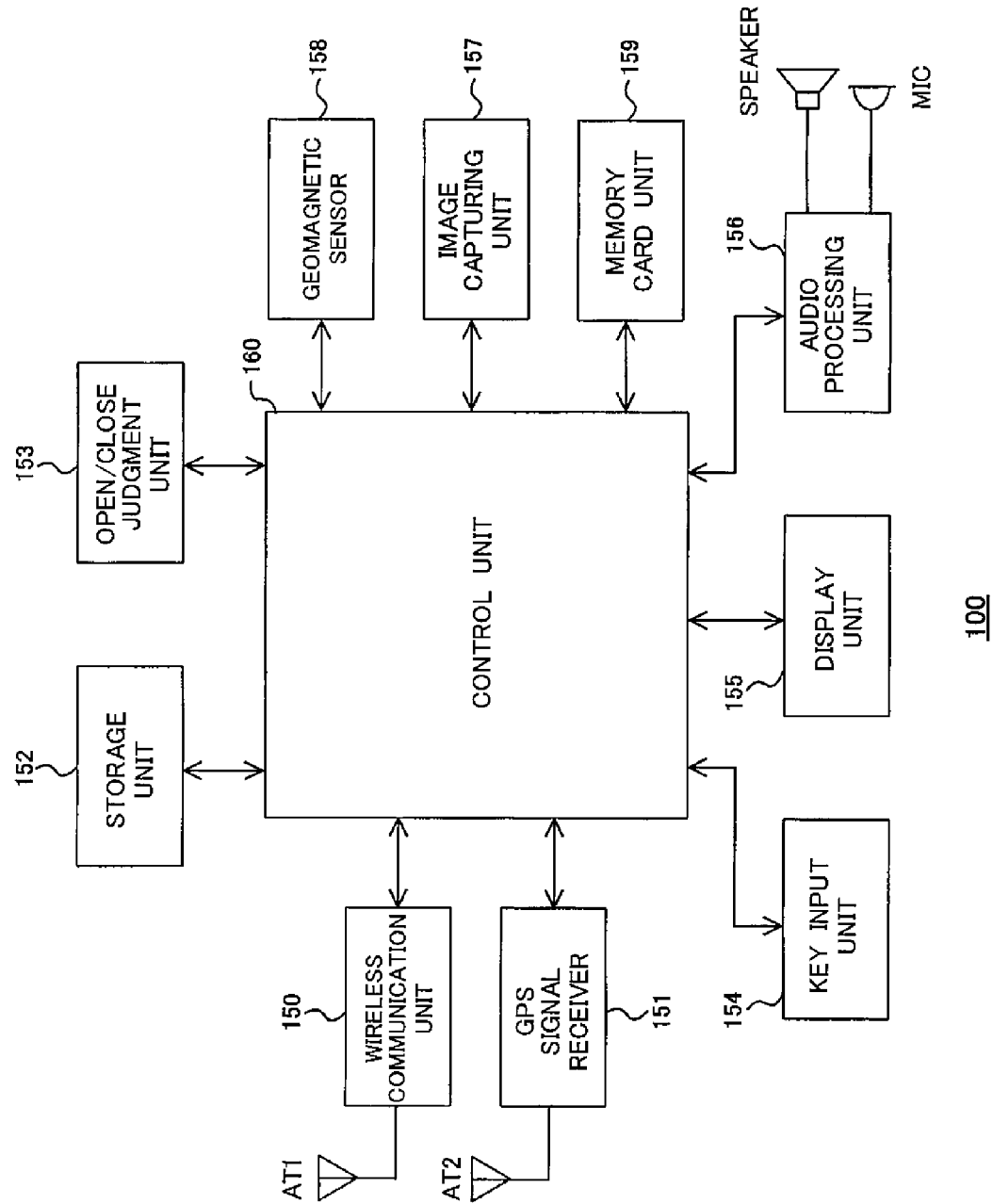
FIG. 6 is a block diagram showing an example of the configuration of a mobile cellular phone according to an embodiment of the present invention.

FIG. 6 is a block diagram showing a illustrative example of the configuration of the cellular phone 100 according to the embodiment of the present invention.

The cellular phone 100 has a wireless communication unit 150, GPS signal receiver 151, storage unit 152, open/close judgment unit 153, key input unit 154, display unit 155, audio input/output unit 156, image capturing unit 157, geomagnetic sensor 158, memory card unit 159, and signal processing/control unit 160.

The wireless communication unit 150 is an embodiment of the wireless communicating means of the present invention.

The GPS signal receiver 151 is an embodiment of the GPS signal receiving means of the present invention.

The GPS signal receiver 151 and the wireless communication unit 150 are an embodiment of the location information acquiring means of the present invention.

The open/close judgment unit 153 is an embodiment of the operation state judging means of the present invention.

The display unit 155 is an embodiment of the displaying means of the present invention.

The geomagnetic sensor 158 is an embodiment of the geomagnetic sensor of the present invention.

The memory card unit 159 is an embodiment of the storage medium mounting means of the present invention.

The signal processing/control unit 160 is an embodiment of the signal processing/controlling means of the present invention.

The wireless communication unit 150 performs processing concerning wireless communication with the base station 150 in cooperation with the signal processing/control unit 160. For example, it applies predetermined modulation processing to the transmission data output from the signal processing/control unit 160 to convert it to a wireless signal and transmits the same from a first antenna AT1. Further, the wireless communication unit 150 applies predetermined demodulation processing to the wireless signal received at the first antenna AT1 to reproduce the reception data and outputs the same to the signal processing/control unit 160.

The wireless communication unit 150 also performs processing for receiving a reference signal for position finding transmitted from the base station 300 serving as the location information acquiring means.

The GPS signal receiver 151, in cooperation with the signal processing/control unit 160, receives the GPS signal transmitted from the GPS use satellites 20 via a second antenna AT2 and applies signal processing such as amplification, noise elimination, and modulation to acquire the information required for calculating the geographical location of the cellular phone 100 in the GPS server system 401.

The storage unit 152, in cooperation with the signal processing/control unit 160, stores a program to be executed in the signal processing/control unit 160, constant data used in the processing for the signal processing/control unit 160, and variable data, image capturing image data, etc. which must be temporarily stored.

The open/close judgment unit 153, in cooperation with the signal processing/control unit 160, judges which of the open state or the closed state explained above is the state of rotation of the first housing 2 and the second housing 3 by the movable mechanism unit 4. For example, the open/close judgment unit 153 includes a detector such as a switch for detecting the closed state where the first housing 2 and the second housing 3 are superimposed so as to distinguish between the closed state and the state other than that.

The key input unit 154, in cooperation with the signal processing/control unit 160, generates a signal in accordance with any input operation such as depression of a key carried out with respect to the operation keys 311 and the camera module use tact switches 35 and outputs the same to the signal processing/control unit 160.

The display unit 155 makes the display panel 21 display an image in accordance with the image data generated in the signal processing/control unit 160 in cooperation with the signal processing/control unit 160.

The audio processing unit 156, in cooperation with the signal processing/control unit 160, converts an input audio to an electric audio signal at the microphone 312, applies processing such as amplification, analog-digital conversion, and encoding to this, and outputs the audio data as the result of the processing to the signal processing/control unit 160. Further, the audio processing unit 156 applies signal processing such as decoding, digital/analog conversion, and amplification to the audio data input from the signal processing/control unit 160 to generate an audio signal and converts this to audio at the speaker 22.

The image capturing unit 157, in cooperation with the signal processing/control unit 160, captures the image incident at the optical system 34a to generate image data such as a still image and moving image and outputs the same to the signal processing/control unit 160. The image capturing unit 157, under the control of the signal processing/control unit 160, operates the flash lamp at the time of the image capture to emit a flash from the light emitting window 321.

The geomagnetic sensor 158 detects the earth-geomagnetism used for the calculation of the bearing. For example, as shown in FIG. 5, the geomagnetic sensor 158 detects the earth-geomagnetism in each axial direction at a fixed location on the main board 37 with reference to a Cartesian coordinate system set on the main board 37. For the detection of the earth-geomagnetism, use is made of various methods such as a method utilizing excitation of a coil, a method utilizing the Hall effect, and a method utilizing a magnetoresistance element.

In the present embodiment, as an example, it is assumed that the geomagnetic sensor 158 mounts an analog-digital converter and outputs analog signals of the detected earth-geomagnetism as 8-bit digital signals, that is, integer values of from "0" to "255".

The signal processing/control unit 160 has a computer for executing processing based on a program stored in the storage unit 152 and performs various processing concerning the overall operation of the cellular phone 100.

For example, as processing concerning the phone function, the signal processing/control unit 160 performs processing for controlling the sequence of calling and reception via the wireless communication unit 150 in accordance with a key input operation in the key input unit 154 and processing for transmitting/receiving the audio data input/output at the audio processing unit 156 via the wireless communication unit 150.

As processing concerning the data communication function, the signal processing/control unit 160 operates the wireless communication unit 150 in response to a key input operation in the key input unit 154, performs the communication with a predetermined mail server system, and performs a processing for transferring the data such as electronic mail.

As the processing concerning the image capturing function, the signal processing/control unit 160 performs processing for making the image capturing unit 157 execute processing to capture a still image and moving image in response to a key input operation in the key input unit 154 and processing for applying image processing such as compression and encoding to the data of the captured image and storing the result in the storage unit 152 etc. At the time of the capture of a still image, the signal processing/control unit 160 also performs processing for operating the flash lamp at a suitable timing.

The signal processing/control unit 160, as processing concerning the map information display processing function, performs processing for calculating the geographical bearing based on the detection value of the geomagnetic sensor 158, processing for transmitting information of the GPS signals received at the GPS signal receiver 151 to the GPS server system 401 and acquiring the location information of the present position, processing for transmitting this location information to the navigation server system 402 and acquiring the information of a map on the surroundings of the present position, processing for calculating the present position based on a position finding signal from the base station 300 and the result of calculation of the bearing, processing for controlling the orientation of the map on the display screen of the display unit 155 in accordance with the result of calculation of the bearing (heading up display processing), etc.

The signal processing/control unit 160, in order to deal with the fact that the orientation of the display panel 21 with respect to the user differs by 180 degrees between the open state and the closed state of the first housing 2 and the second housing 3, performs processing for rotating the displayed image of the display unit 155 in accordance with the judgment result of the open/close judgment unit 153.

The operation of the cellular phone 100 having the configuration explained above will be explained next focusing on the map display processing function according to the present invention.

First, the processing for reception of the GPS signal performed principally by the signal processing/control unit 160 when the power of the cellular phone 100 is turned on will be explained.

Figure 7:
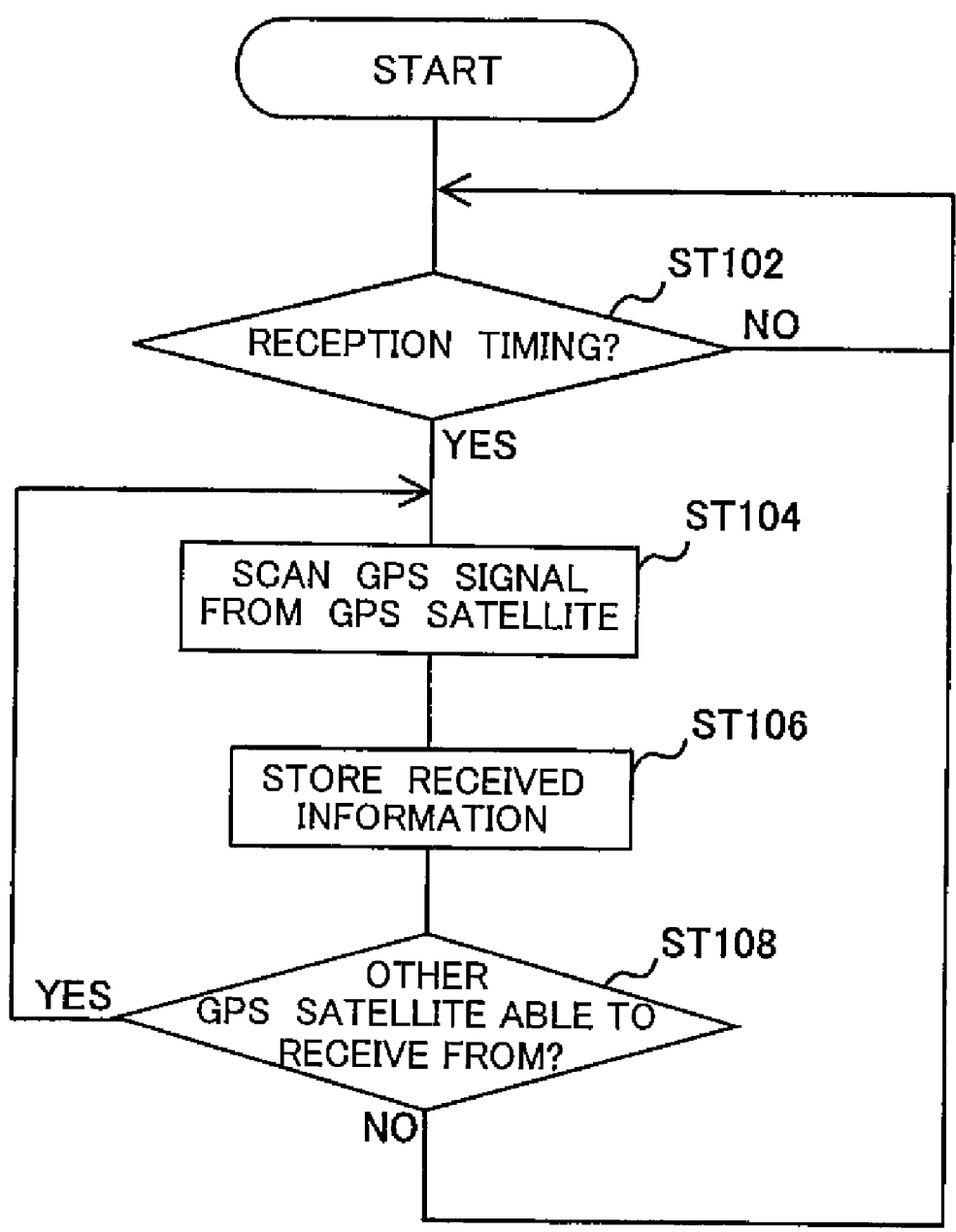
FIG. 7 is a flow chart illustrating an example of GPS signal reception processing in a mobile cellular phone.

FIG. 7 is a flow chart illustrating an example of the GPS signal reception processing in the cellular phone 100.

The signal processing/control unit 160 controls the GPS signal receiver 151 at a constant cycle of for example an interval of 2 seconds (ST102, ST104) and performs a scan for receiving a GPS signal from a GPS satellite. When the result of the scan is that the GPS signal can be received, the signal processing/control unit 160 stores the received GPS signal in the storage unit 152 (ST106). Such a scan for a GPS signal and the storage of the information are repeated for all GPS satellites from which data can be received (ST108, ST104, ST106). When the scan is carried out for all GPS satellites, the signal processing/control unit 160 waits until the next GPS signal reception timing, then performs the processing for steps ST104 to 108 again.

Next, the position finding processing will be explained.

Figure 8:
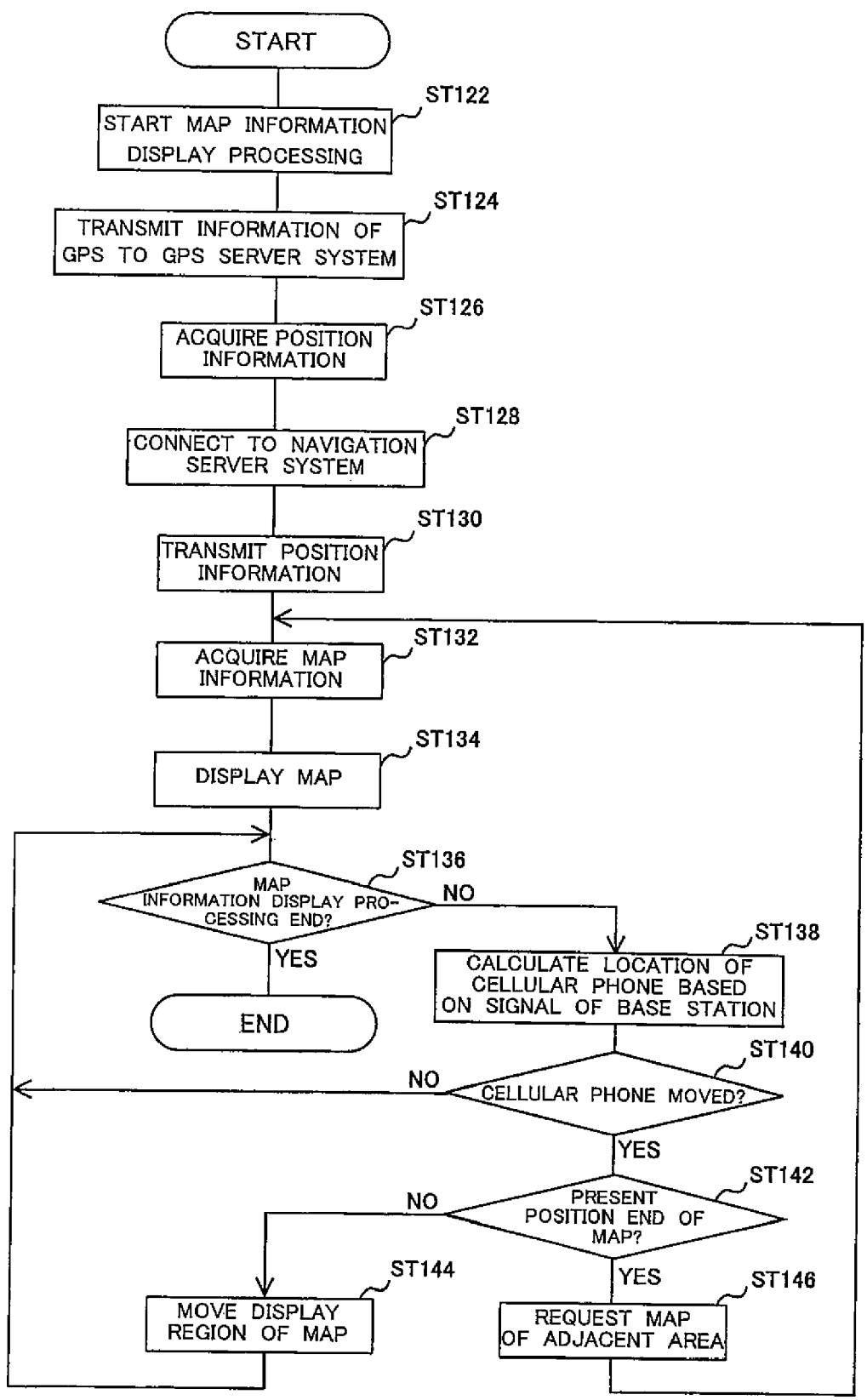
FIG. 8 is a flow chart illustrating an example of position finding processing in a mobile cellular phone.

FIG. 8 is a flow chart illustrating an example of the position finding processing in the cellular phone 100.

The signal processing/control unit 160, when a start of the position finding processing is selected by for example a key input operation in the key input unit 154 (ST122), performs the processing for transmitting the information obtained by the above GPS reception processing from the wireless communication unit 150 via the base station 300 and the communication network to the GPS server system 401 (ST124).

The GPS server system 401, when receiving the GPS information from the cellular phone 100, calculates the location of the present position (for example latitude and longitude) of the cellular phone 100 based on this received GPS information and transmits the result of the calculation from the communication network through the base station 300 to the cellular phone 100.

The signal processing/control unit 160 receives the location information transmitted from the GPS server system 401 and stores the same in the storage unit 152 (ST126).

Next, the signal processing/control unit 160 accesses the navigation server system 402 from the wireless communication unit 150 via the base station 300 and the communication network (ST128) and transmits the acquired location information to the navigation server system 402 (ST130).

The navigation server system 402, when receiving the location information from the cellular phone 100, retrieves the map information on the surroundings of the present position of the cellular phone 100 specified by this location information from the database and transmits the retrieved map information from the communication network via the base station 300 to the cellular phone 100.

The signal processing/control unit 160 receives the map information transmitted from the navigation server system 402 and stores the same in the storage unit 152 (ST132).

Figure 9:
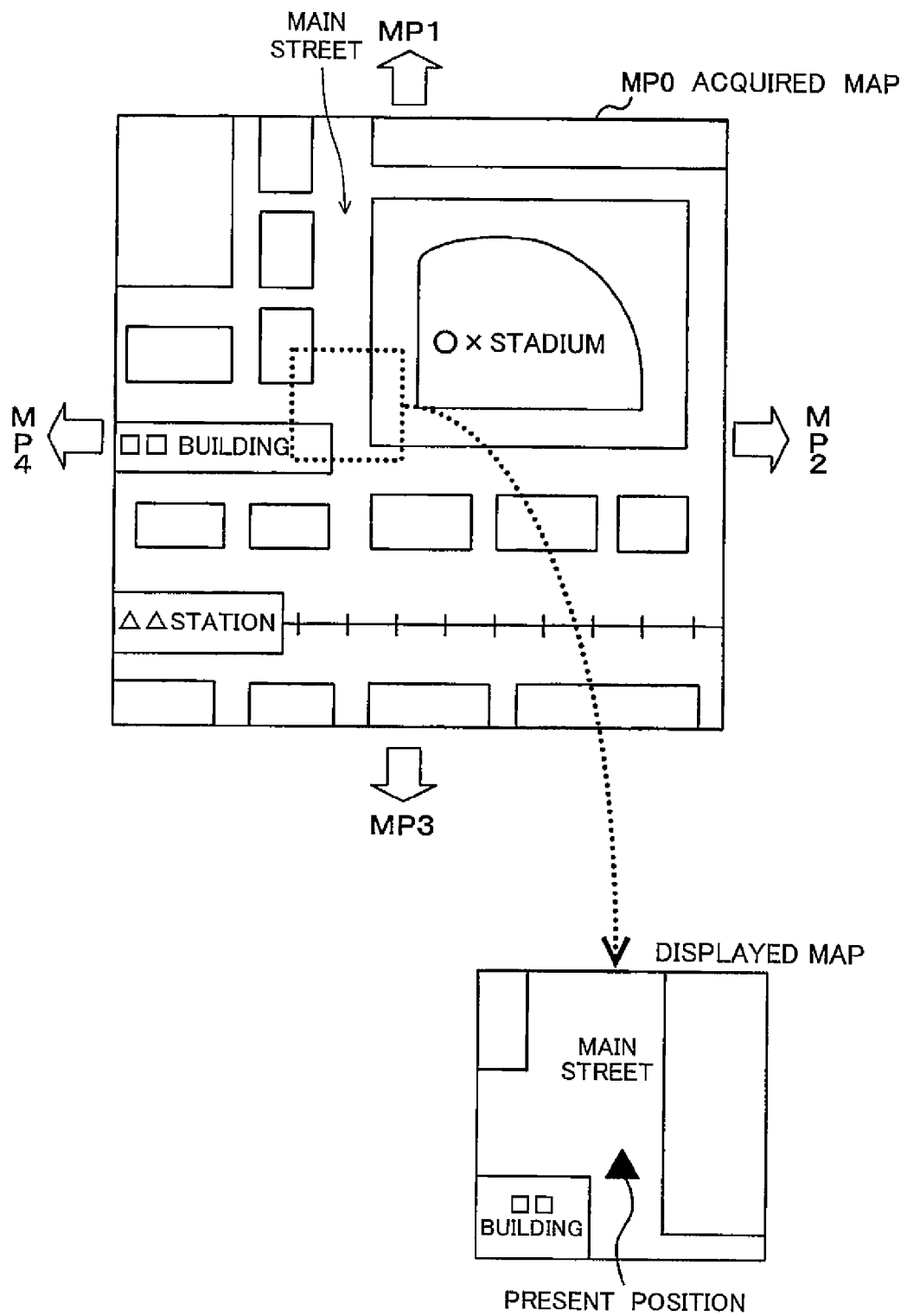
FIG. 9 is a diagram showing an example of map information transmitted from a navigation server system.

FIG. 9 is a diagram showing an example of the map information transmitted from the navigation server system 402.

In the present embodiment, as an example, it is assumed that inherent identification numbers are assigned to the map information. The navigation server system 402, based on the identification numbers, manages the map data for each predetermined size (for example 1 km square) and, when transmitting the map information to the cellular phone 100, attaches these identification numbers to the data of the map for transmission. In the example of FIG. 9, the map of the surroundings of the present position has an identification number MP0, and the maps around that in the four directions have the identification numbers MP1 to MP4.

The signal processing/control unit 160, when receiving such map information, generates the image data of the map on the surroundings of the present position based on the acquired map information and displays the map on the display panel 21 of the display unit 155 (ST134).

The region of the map displayed on the display panel 21 is a region smaller than the 1 km square map acquired from the navigation server system 402 (for example 200 m×300 m).

As the display method of the map, it is possible to select either of for example north up display (the display of turning the north of the map toward the top of the screen) and heading up display (the display of turning the advancing direction on the map toward the top of the screen).

When a north up display is selected by the key operation of the key input unit 154, the signal processing/control unit 160 fixes the north direction of the map at the upward direction of the display screen and displays it on the display unit 155.

When a heading up display is selected by the key operation of the key input unit 154, the signal processing/control unit 160 performs the processing for controlling the orientation of the map on the display screen in accordance with the bearing found by the processing for calculation of the bearing explained later. For example, when a direction A going from one end at which the microphone 312 of the second housing 3 is arranged toward the other end having a connection part (see FIG. 2) is determined as the advancing direction of the cellular phone 100, the orientation of the map on the display screen is controlled so that the bearing of this advancing direction becomes upward on the display screen.

"Upward on the display screen" explained here is the case seen from the viewpoint of the user holding the second housing 3 and utilizing the cellular phone 100. When the open/closed state of the housings 2 and 3 is changed, "upward on the display screen" changes in accordance with this. Namely, when the housings 2 and 3 are in the open state, the speaker 22 side in the first housing 2 becomes the top of the display screen, while when the housings 2 and 3 are in the closed state, the connection part side of the first housing 2 becomes the top of the display screen.

The signal processing/control unit 160, as will be explained later, performs processing for rotating the image on the display screen in accordance with the open/closed state of the housings 2 and 3 and displays the image in a suitable orientation with respect to the user.

When the display of the map is started as explained above, the signal processing/control unit 160 repeats the processing for step ST138 and the following steps explained next during the period until the end of the position finding processing is selected by the key operation of the key input unit 154 (ST136).

First, the signal processing/control unit 160 makes the wireless communication unit 150 receive reference signals for position finding transmitted from the plurality of (for example three or more) base stations 300 in the surroundings of the cellular phone 100 and calculates the location of the present position based on the received signals (ST138). Then, the signal processing/control unit 160 judges for the presence of any movement of the cellular phone 100 from the results of calculation of the present position (ST140) and, when judging that the cellular phone 100 does not move, subsequently performs the calculation of the present position based on the reference signals from the base stations 300 (ST138).

Where judging at step ST140 that the cellular phone 100 moves, the signal processing/control unit 160 judges whether or not the point being moved to exists in a region at an end of the map which is acquired at present (ST142). For example, when the part of the map to be displayed on the display unit is not included in the map acquired at present, but is included in a map adjacent to this, it is judged that the present position exists in the region at an end of the map.

When judging that the present position exists at an end region, the signal processing/control unit 160 requests the map adjacent to this end region from the navigation server system 146 by the wireless communication unit 150 (ST146). For example, it transmits the identification number of the map being acquired at present and the information indicating to which bearing among east, west, south, and north is the present position adjacent to with respect to this map to the navigation server system 146.

The navigation server system 146 detects the map in accordance with the information sent from the cellular phone 100 from the database and transmits the same to the cellular phone 100.

The signal processing/control unit 160 receives the map information transmitted from the navigation server system 402, stores the same in the storage unit 152 (ST132), and displays the map in accordance with the map information on the display unit 155 (ST134). Thereafter, it repeats the processing for step ST138 and the following steps.

Further, when judging that the present position does not exist at the end region, the signal processing/control unit 160 performs processing for moving the display region of the map so that for example the present position of the cellular phone 100 becomes the center of the map being displayed in accordance with the results of calculation of the present position. Thereafter, the signal processing/control unit 160 repeats the processing for step ST138 and the following steps.

Next, as an example of an "event" for the cellular phone 100, the processing for rotation of the display image in accordance with when the open/closed state of the cases changes will be explained.

Figure 10:
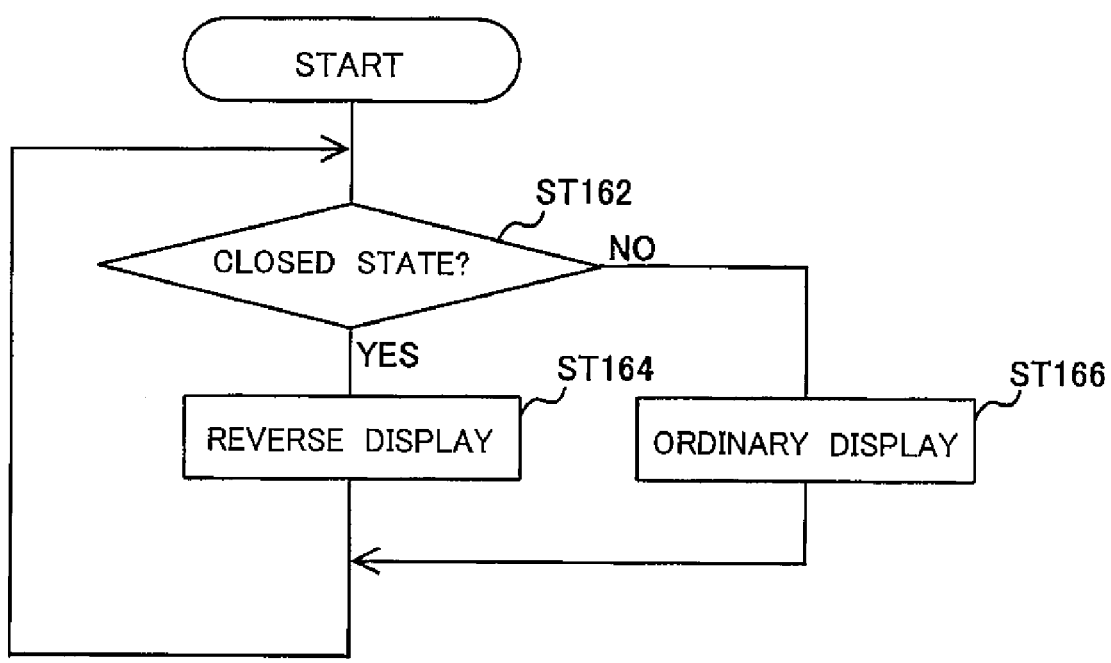
FIG. 10 is a flow chart illustrating an example of rotation processing for a display image in a mobile cellular phone.

FIG. 10 is a flowchart illustrating an example of the processing for rotation of the display image in the cellular phone 100.

The signal processing/control unit 160 constantly monitors the open/closed state judged in the open/close judgment unit 153 during a period when the power of the cellular phone 100 is ON (ST162). When the open/close judgment unit 153 judges that the cases are not in the closed state (that is, they are in the open state), the signal processing/control unit 160 displays the image on the display panel 21 with an orientation so that the speaker 22 side in the first housing 2 becomes the top of the image (ST166).

When this display in the open state is the ordinary display, in the case where the closed state is judged by the open/close judgment unit 153, the signal processing/control unit 160 rotates the image in the ordinary display by 180 degrees and displays it on the display panel 21 (ST164). Namely, it displays the image on the display panel 21 with an orientation so that the connection part side of the first housing 2 becomes the top of the image.

According to such rotation processing for the display image, irrespective of the open/closed state of the housings 2 and 3, the image can be always displayed on the display unit 155 with an orientation easy for the user to view.

Processing for Calculation of Bearing

First, the method of calculation of the bearing will be explained in brief with reference to FIG. 11, then some examples of the processing for calculation of the bearing in the signal processing/control unit 160 will be explained with reference to FIG. 12 to FIG. 19.

Figure 11:
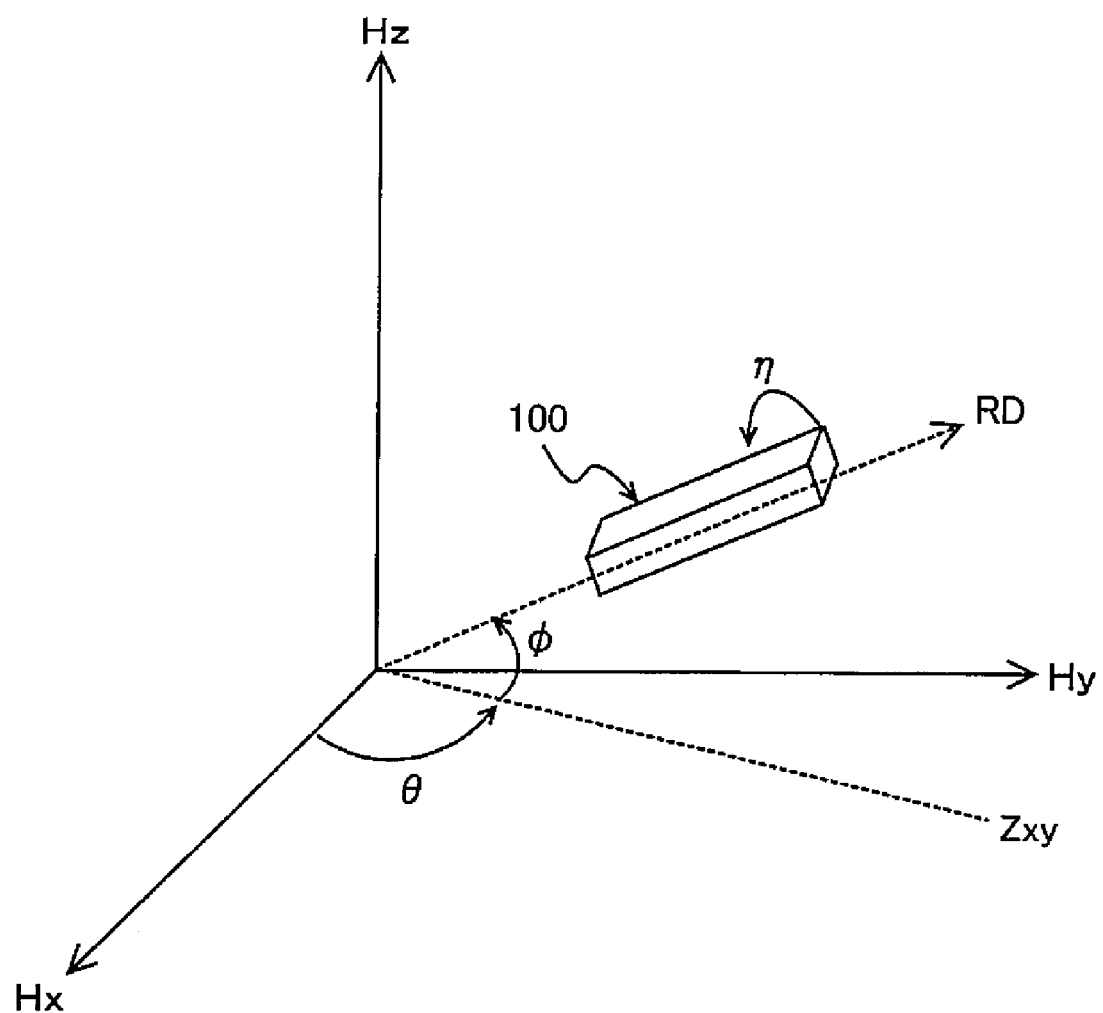
FIG. 11 is a diagram for explaining a method of calculation of an azimuth angle.

FIG. 11 is a diagram for explaining the method of calculation of the azimuth angle.

In FIG. 11, a Cartesian coordinate system having the coordinate axes Hx, Hy, and Hz is the standard coordinate system set on the horizon plane. The coordinate axes Hx and Hy are coordinate axes parallel to the horizon plane, and the coordinate axis Hz is the coordinate axis oriented in a direction vertical to the horizon plane.

The azimuth angle θ is an angle formed by an image Zxy obtained by orthogonal projection, onto the horizon plane, of a vector in a reference direction RD (for example the direction A in FIG. 2) of the earth-geomagnetism detection set for the geomagnetic sensor 158 provided on the main board 37 of the second housing 3 and the coordinate axis Hx. An inclination angle φ is the angle formed by this image Zxy and the vector in the reference direction A. Further, a twist angle η is the angle formed by rotating the cellular phone 100 around a rotation axis comprised of the vector of the reference direction A.

When all of the azimuth angle θ, the inclination angle φ, and the twist angle η are zero, the coordinate system of the earth-geomagnetism detection set on the main board 37 of the second housing 3 coincides with the coordinate system of the coordinate axes Hx, Hy, and Hz shown in FIG. 11.

When the earth-geomagnetism detection value corresponding to the coordinate axis Hx according to the geomagnetic sensor 158 is α, the earth-geomagnetism detection value corresponding to the coordinate axis Hy is β, and the earth-geomagnetism detection value corresponding to the coordinate axis Hz is γ, a tangent tan θ of the azimuth angle θ shown in FIG. 11 is represented by the following equation. φ is the inclination angle of the display panel 21.

(Equation 1)

$$\tan \theta = \beta/(\gamma \cdot \sin \phi - \alpha \cdot \cos \phi) \tag{1}$$

In equation (1), the twist angle η is set at zero.

The signal processing/control unit 160 calculates the azimuth angle in accordance with the detection values of earth-geomagnetism in three directions obtained from the geomagnetic sensor 158 by using the relationship shown in Equation (1).

The signal processing/control unit 160 considers also the inclination angle φ of the display panel 21 with respect to the horizon plane in the calculation of the bearing explained above.

The user can view the image of the display panel 21 by a comfortable posture when inclining the display panel 21 with an angle of for example about 45 degrees. Therefore, the signal processing/control unit 160 calculates the bearing according to Equation (1) by using the inclination angle φ when the inclination angle φ of the display panel 21 with respect to the horizon plane becomes for example preferably 45 degrees.

When the inclination angle φ of the geomagnetic sensor 158 with respect to the horizon plane is different between the open state and the closed state of the housings 2 and 3, the signal processing/control unit 160 may calculate the azimuth angles of these states by considering the difference of this inclination angle. For example, in contrast to when the first housing 2 and the second housing 3 are superimposed almost parallel in the closed state, assume that two housings are connected so that the first housing 2 and the second housing 3 are relatively inclined in the open state. In this case, when the user tries to maintain the direction of the line of sight constant with respect to the display panel 21 by both operation styles, the inclination of the second housing 3 with respect to the horizon plane is different between the open state and the closed state. The difference of inclination of the second housing 3 means that the inclination of the reference direction A with respect to the horizon plane is different between the open and closed states. Therefore, the signal processing/control unit 160 performs the calculation of the bearing by using the inclination angle φ of a predetermined angle in accordance with the result of judgment of the open/close judgment unit 153. This inclination angle φ is an angle previously set so as to become constant in both of the open state and the closed state when the inclination angle φ of the display panel 21 with respect to the horizon plane is for example preferably 45 degrees.

The information of the inclination angle φ is previously stored in the storage unit 152 as for example a data table. When detecting the bearing, the signal processing/control unit 160 reads out the information of the inclination angle φ linked with the results of judgment of the open/close judgment unit 153 from the data table in the storage unit 152 and calculates the bearing by using the information of this inclination angle φ.

Processing for Calculation of Bearing

Figure 12:
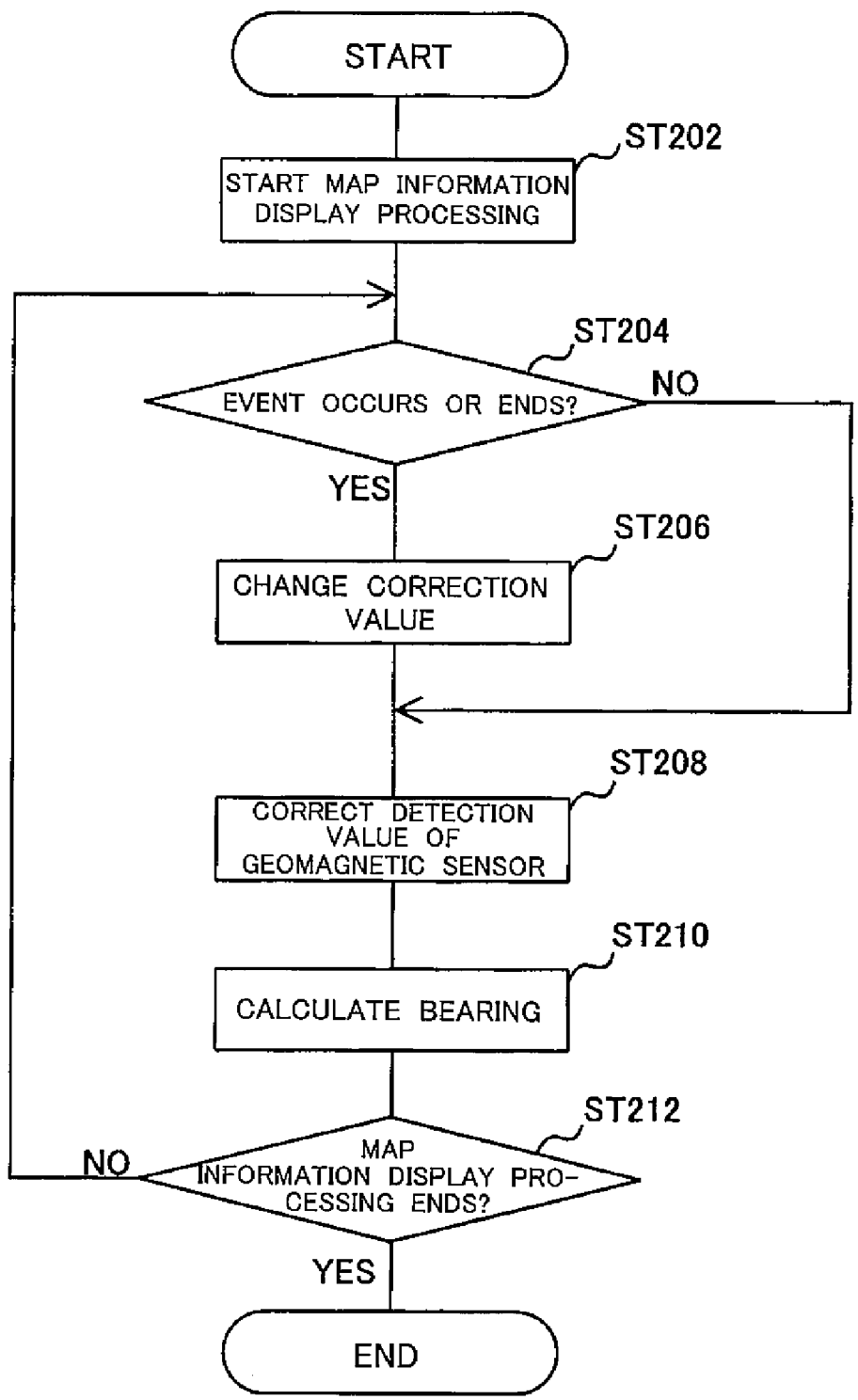
FIG. 12 is a flow chart illustrating a first example of processing for calculation of the bearing in a mobile cellular phone.

FIG. 12 is a flow chart illustrating an example of the processing for calculation of the bearing in the cellular phone 100.

When the start of the position finding processing is selected by the key input operation etc. at the key input unit 154, the signal processing/control unit 160 activates the geomagnetic sensor 158 and acquires the information of the bearing (ST202), then checks whether a predetermined event (phenomenon) has occurred or end the routine (ST204).

The "predetermined event" here means an event causing a change in the detection value of the geomagnetic sensor 158 in the circuit and processing system in the cellular phone 100 when displaying information of the bearing (map of heading up display or compass indicating the bearing) on the display unit 155. This predetermined event includes an event of operating the wireless communication unit 150 in for example a case where the map information is acquired from the navigation server system 402 at step ST146 of FIG. 8 and a case where call reception processing and mail reception processing are carried out. The predetermined event may include an event changing a display luminance on the display unit 155 in accordance with the key input operation, a change of the information of the bearing, updating of the display of the map etc., an event of operating the audio processing unit 156 and outputting audio from the speaker, and so on. As the predetermined event, where the display unit 155 has an LCD panel, for example an event of turning on/off the light source serving as the LCD back light or changing the strength of light emission of the light source may be included.

When the occurrence of such a predetermined event is detected, the signal processing/control unit 160 reads out the correction data of the previously prepared earth-geomagnetism detection values from the storage unit 152 corresponding to the detected event and changes the correction data in use at present.

FIG. 13 is a diagram showing an example of the correction data.

In the example of FIG. 13, the correction data is comprised of three correction values corresponding to the X-axis, Y-axis, and Z-axis detection values of the geomagnetic sensor 158. For example, when performing the communication processing for operating the wireless communication unit 150, the signal processing/control unit 160 reads out the "−1", "0",and "−1" correction values corresponding to the X-axis, Y-axis, and Z-axis earth-geomagnetism detection values from the storage unit 152.

The storage unit 152 stores for example such correction data corresponding to a plurality of events. Each correction value of the correction data is determined by previously measuring the amounts of fluctuation of the earth-geomagnetism detection value in the case where each event occurs and the case where the event does not occur.

When detecting the occurrence of a plurality of events at step ST204, the signal processing/control unit 160 adds the correction values of the correction data corresponding to the detected events to the earth-geomagnetism detection values in three directions. For example, in the example of FIG. 13, where both of communication processing and audio output processing occur, when the detection value of the geomagnetic sensor is ±255, the X-axis correction value becomes "−1"+"−1"="−2", the Y-axis correction value becomes "0"+ "0"="0", and the Z-axis correction value becomes "−1"+ "0"="−1".

Further, when the end of a certain event is detected at step ST204, the signal processing/control unit 160 subtracts the correction values of the correction data corresponding to the ended event from the present values. For example, when the X-axis, Y-axis, and Z-axis correction values at present are the states of "−2", "−1", and "1" and the communication processing shown in FIG. 13 ends, the X-axis correction value is changed to "−2"−"−1"="−1", the Y-axis correction value is changed to "−1"−"0"="−1", and the Z-axis correction value is changed to "1"−"−1"="2".

The signal processing/control unit 160 corrects the detection values of the geomagnetic sensor 158 based on the correction data read out from the storage unit 152 (ST208). Namely, it adds the corresponding correction values of the correction data to the detection values in three directions of the geomagnetic sensor. Then, by using the earth-geomagnetism detection values after this correction, it calculates the bearing by the above method of calculation (ST210).

The signal processing/control unit 160 repeats the processing for steps ST204 to ST210 explained above during a period where the position finding processing is executed (ST212).

As described above, according to the first example of the processing for calculation of the bearing shown in FIG. 12, when displaying the information of the bearing on the display unit 155, the occurrence of a predetermined event (including an end of an event) changing the magnetic field inside the cellular phone 100 is monitored by the signal processing/control unit 160. When the occurrence of a predetermined event is detected, the information of the bearing is corrected.

Accordingly, even when the detection values of the geomagnetic sensor 158 change due to the occurrence of an event, and the precision of the information of the bearing displayed on the display unit 155 is lowered, by detecting the occurrence of the event and correcting the information of the bearing, the precision of the information of the bearing can be restored.

Further, the correction data previously determined for each event and stored in the storage unit 152 is used for correction of the information of the bearing, therefore the information of the bearing can be corrected with a good precision for each occurring event.

Figure 14:
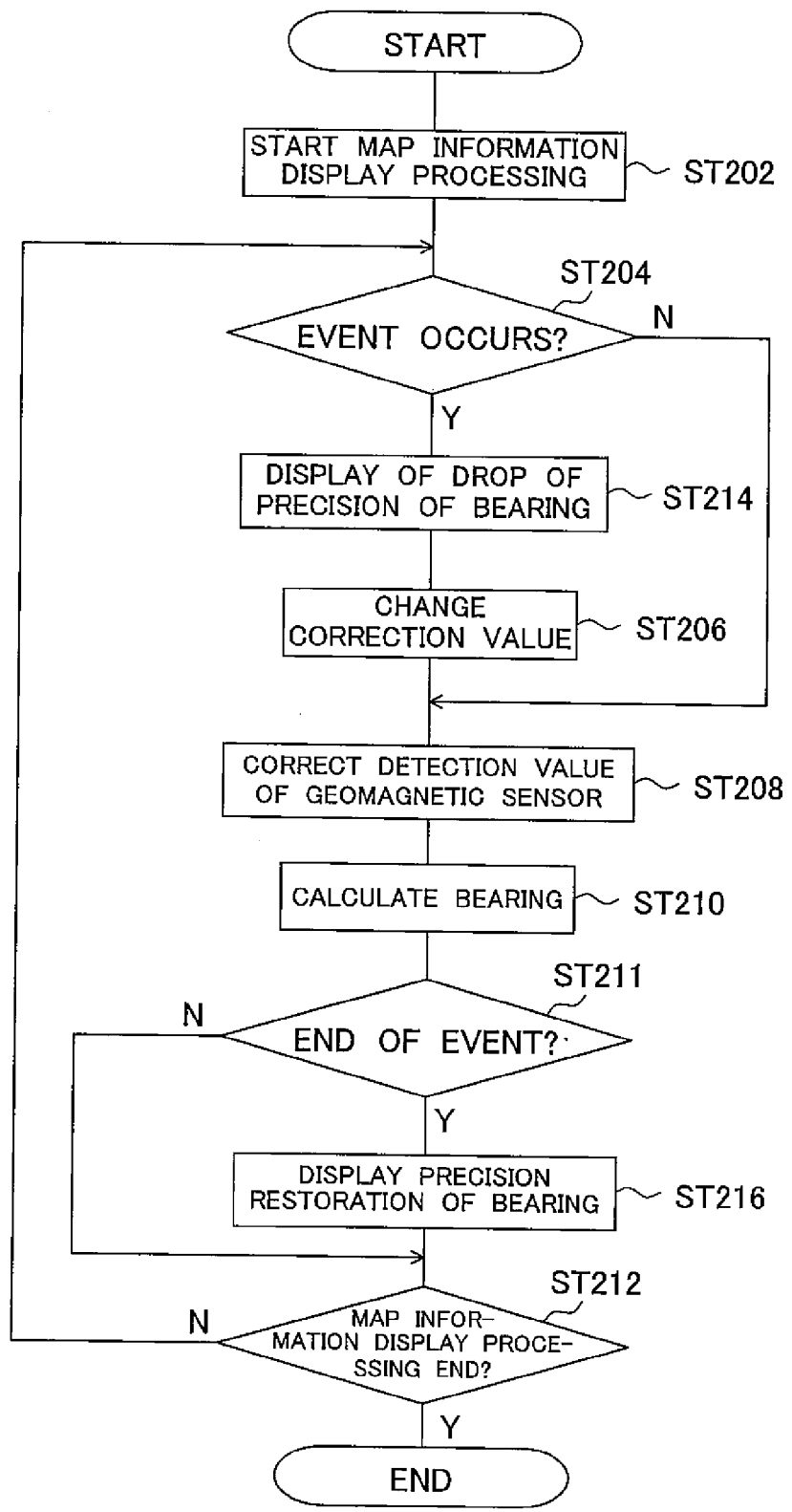
FIG. 14 is a flow chart illustrating a second example of processing for calculation of the bearing in a mobile cellular phone.

FIG. 14 is a flow chart illustrating a further example of the processing for calculation of the bearing in the cellular phone 100.

The difference of FIG. 14 from FIG. 12 explained above resides in the point that during the period from detecting the occurrence of a predetermined event to the computation for correction of the information of the bearing and the display of the information of the bearing of the result of the computation on the display unit 155, the fact that the precision of the information of the bearing displayed on the display unit 155 is low is displayed on the display unit 155

Namely, when detecting the occurrence of a predetermined event at step ST204, the signal processing/control unit 160 displays the fact that the precision of the information of the bearing displayed on the display unit 155 is low on the display unit 155 (ST214). For example, when displaying an image of a compass representing the bearing, it is possible to display movement of this compass swinging leftward and rightward so as to indicate that the precision of the information of the bearing is low. Further, it is possible to change the shape, color, and size of the image of the compass or display another image indicating that the precision of the bearing is low.

The signal processing/control unit 160 displays information indicating the drop of precision of the bearing on the display unit 155 during a change of the correction values (ST206), correction of the magnetic detection values (ST208), and calculation of the bearing (ST210). Then, when displaying the information of the bearing after correction on the display unit 155, when the precision of the bearing is restored (ST211), this restoration is displayed on the display unit 155 (ST216).

For example, when displaying a drop of the precision of the bearing by movement swinging the image of the compass rightward and leftward, it is possible to suspend this rightward and leftward swinging to indicate restoration of the precision of the bearing. When displaying a drop of the precision of the bearing by changing the shape, color, and size of the image of compass, it is possible to return this to the original state to indicate the restoration of the precision. Alternatively, it is possible to display another image indicating the restoration of the precision of the information of the bearing.

As described above, according to the second example of the processing for calculation of the bearing shown in FIG. 14, when the correction values of the earth-geomagnetism detection values change due to the occurrence of a predetermined event (including the end of an event), during the period of recalculating the bearing by new correction values and displaying the results on the display unit 155, the fact that the precision of the information of the bearing being displayed is low can be notified to the user. Due to this, the user becomes able to correctly grasp whether or not the precision of the information of the displayed bearing is low.

Figure 15:
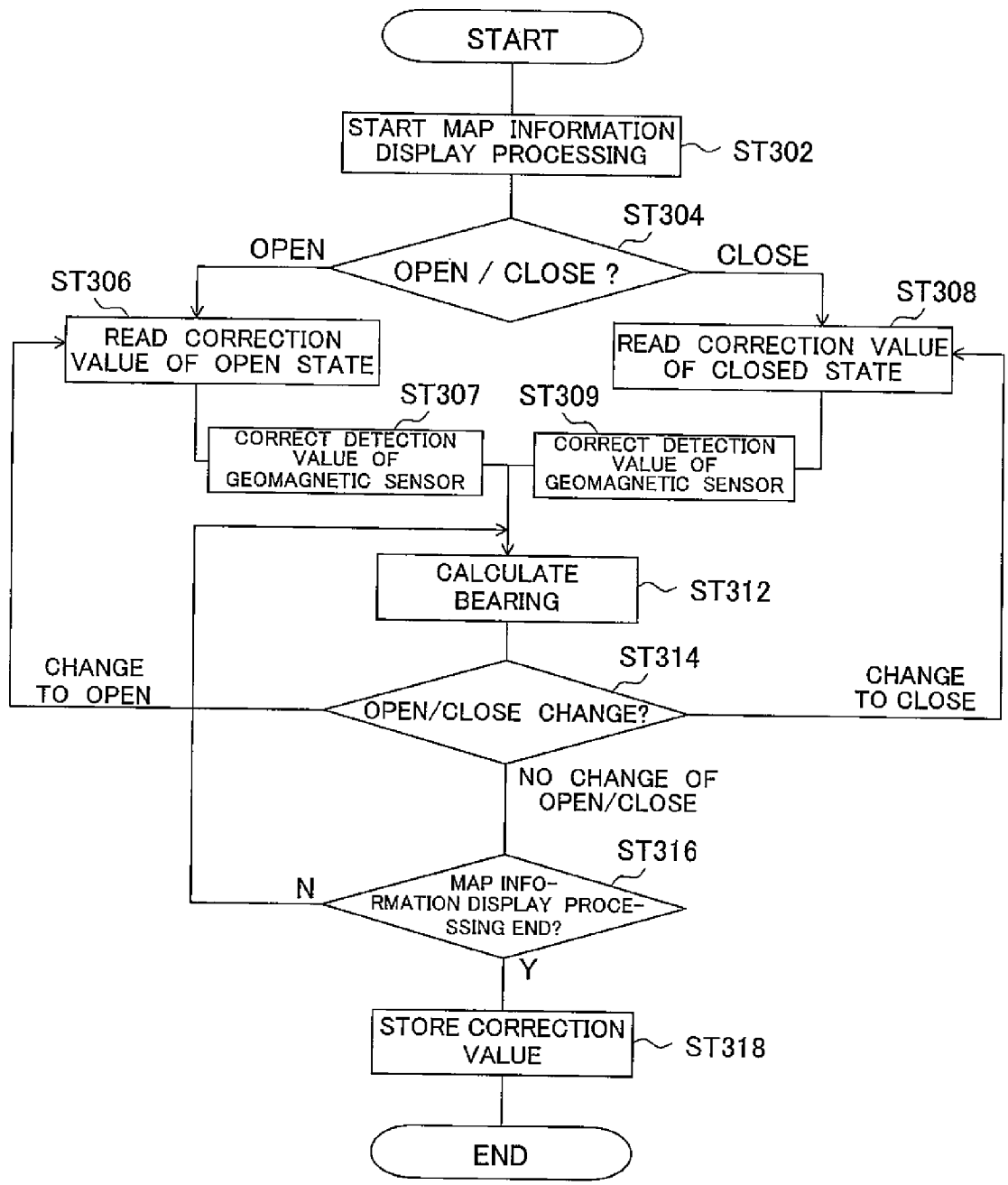
FIG. 15 is a flow chart illustrating a third example of processing for calculation of the bearing in a mobile cellular phone.

FIG. 15 is a flow chart illustrating an example of the processing for calculation of the bearing in the cellular phone 100.

In the processing for calculation of the bearing for the example of FIG. 12 and FIG. 14 explained above, the change of the earth-geomagnetism detection values occurring due to the occurrence of an event in terms of internal processing was corrected, but in the example of FIG. 15 explained next, the change of the earth-geomagnetism detection values in accordance with the open/closed state of the housings 2 and 3 is corrected.

The cellular phone 100 includes for example magnets used in the speaker 22 and other parts generating a static magnetic field different from the dynamic magnetic field generated for each event by the internal processing as explained above. Such a static magnetic field becomes a cause of constant error (offset error) of the earth-geomagnetism detection values and is corrected by the processing for correction of offset error explained later. However, when the open/closed state of the housings 2 and 3 is changed, the positional relationship of these static magnetic field generation sources changes, therefore the offset error changes in accordance with this.

Therefore, in the processing for calculation of the bearing for the third example, in order to reduce the drop of precision of the bearing calculation value due to the change of such offset error, the correction value of the offset error obtained by the processing for correction of offset error is separately held as an event for each of the open state and closed state. Then, where the open/closed state of the housings 2 and 3 changes, the correction values used in the correction of the offset error are changed matching with this.

When the start of the position finding processing is selected by the key input operation etc. at the key input unit 154, the signal processing/control unit 160 activates the geomagnetic sensor 158 and acquires the information of the bearing (ST302), then checks the judgment result of the open/close judgment unit 153 (ST304). When it is judged at the open/close judgment unit 153 that the housings 2 and 3 are in the open state, the signal processing/control unit 160 reads out the offset error correction data of the open state held in for example a not shown register in the signal processing/control unit 160 (ST306) and corrects the detection values of the geomagnetic sensor 158 based on this (ST307). Further, when it is judged in the open/close judgment unit 153 that the housings 2 and 3 are in the closed state, the signal processing/control unit 160 reads out the offset error correction data of the closed state held in a not shown register in the signal processing/control unit 160 (ST308) and corrects the detection values of the geomagnetic sensor 158 based on this (ST309).

Note that the offset error correction data is comprised by for example three correction values corresponding to the earth-geomagnetism detection values in the three directions as shown in FIG. 13. These correction values are frequently acquired at the time of the start of the position finding processing or during the execution thereof by the processing for correction of offset error explained later and written into the predetermined register of the signal processing/control unit 160 provided for each of the open and closed states. The offset error correction data stored in the register is rewritten whenever the processing for correction of offset error is executed and new correction values are acquired.

When correcting the detection values of the geomagnetic sensor 158, the signal processing/control unit 160 calculates the bearing by using the earth-geomagnetism detection values after this correction (ST312).

Then, the signal processing/control unit 160 acquires the judgment result of the open/close judgment unit 153 again and checks whether or not the open/closed state changes (ST314).

When detecting a change from the closed state to the open state, the signal processing/control unit 160 returns to step ST306 where it reads out the offset error correction data in the open state and repeats the correction of the earth-geomagnetism detection values and the calculation of the bearing by using this (ST307, ST312). When detecting a change from the open state to the closed state, the signal processing/control unit 160 returns to step ST308 where it reads out the offset error correction data in the closed state and repeats the correction of the earth-geomagnetism detection values and the calculation of the bearing by using this (ST309, ST312).

When there is no change of the open/closed state, the signal processing/control unit 160 confirms whether or not the end of the position finding processing is selected (ST316). When the position finding processing continues, the signal processing/control unit 160 repeats the correction of the earth-geomagnetism detection values and the calculation of the bearing by using the offset error correction data in use at present (ST307/309, ST312).

When the end of the position finding processing is selected, the signal processing/control unit 160 stores the offset error correction data of the open state and the closed state held in the register in the storage unit 152 (ST318). Due to this, when the position finding processing is carried out the next time, it becomes possible to smoothly calculate the bearing by using the offset error correction data stored in the storage unit 152.

As described above, according to the example of the processing for calculation of the bearing shown in FIG. 15, when displaying the information of the bearing on the display unit 155, the change of the judgment result in the open/close judgment unit 153 is monitored, and when a change is detected, the information of the bearing displayed on the display unit 155 is corrected in accordance with the state after the change (open state or closed state). Namely, when a change is detected, the predetermined correction corresponding to the state after the change is carried out on the detection values of the geomagnetic sensor 159, and the bearing is calculated based on these earth-geomagnetism detection values after the correction.

Accordingly, in the cellular phone 100 structured so that the display of the information of the bearing by the display unit 155 is possible in both of the open state and the closed state, even in the case where the detection values of the geomagnetic sensor 158 change along with the occurrence of an event such as a change of this open/closed state, and the precision of the information of the bearing being displayed is lowered, by detecting the change of the judgment result in the open/close judgment unit 153 and correcting the information of the bearing, the precision of the information of the bearing can be restored.

Further, the offset error correction data of the open state and the closed state are separately held in a predetermined register of the signal processing/control unit 160, and the correction of the information of the bearing is carried out by using the suitable offset error correction data in accordance with the open/closed state, therefore the information of the bearing can be corrected with a high precision in state.

Note that, in the detection of the change of the open/closed state at step ST314, after detecting the change of the open/closed state based on the judgment result of the open/close judgment unit 153, by using the fact that the open or closed state after this change continues for a predetermined time, it may be finally judged that a change from the open state to the closed state or a change from the closed state to the open state occurs. Due to this, when the user unintentionally moves the movable mechanism unit 4 and the change of the open/closed state is instantaneously detected, erroneous change of the offset error correction data can be prevented.

Figure 16:
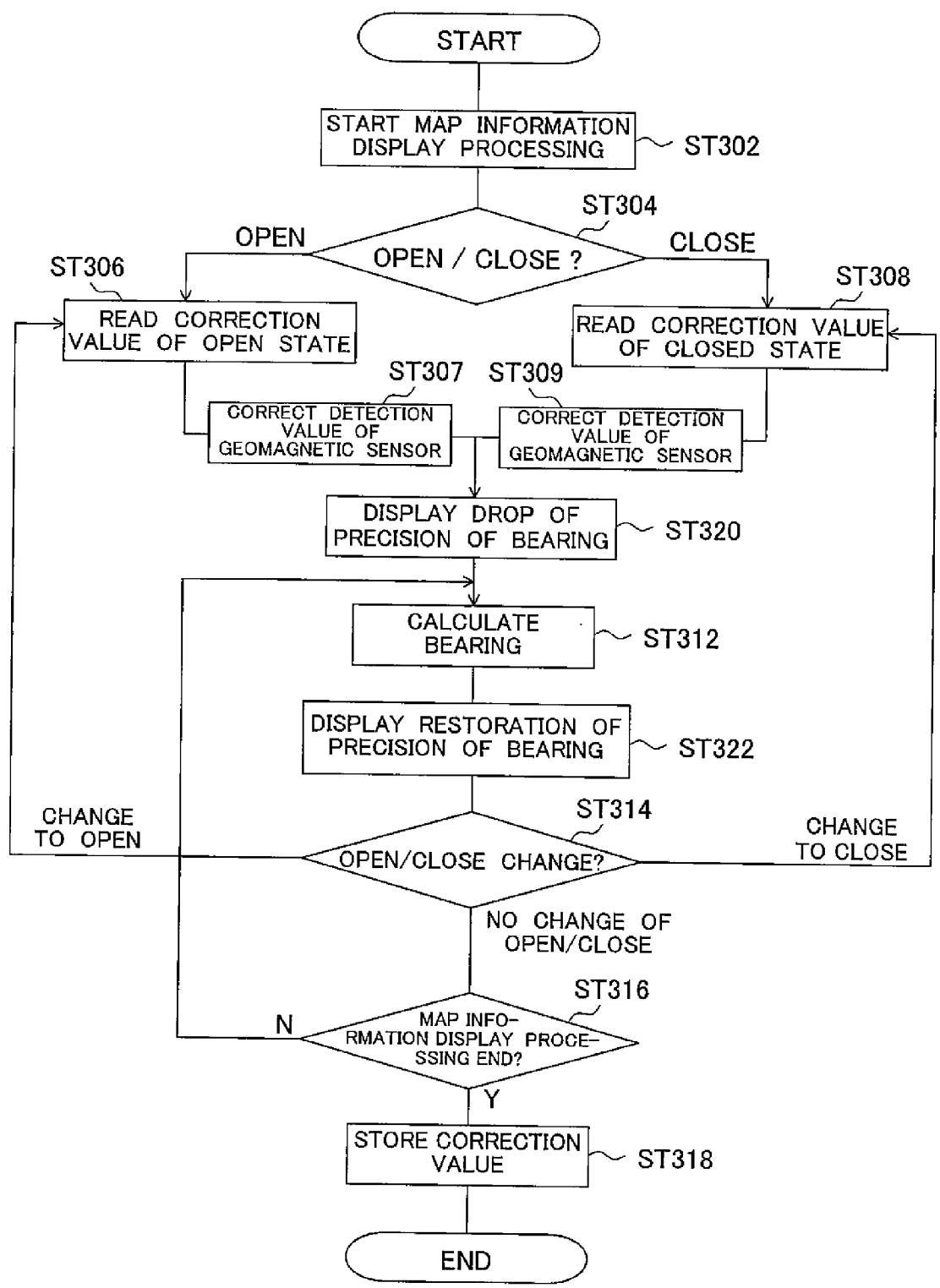
FIG. 16 is a flow chart illustrating a fourth example of processing for calculation of the bearing in a mobile cellular phone.

FIG. 16 is a flow chart illustrating an example of the processing for calculation of the bearing in the cellular phone 100.

The difference of FIG. 16 from FIG. 15 explained above resides in the point that during the period from the detection of the event of a change of the open/closed state in the open/close judgment unit 153 to the recalculation of the bearing and the display of the recalculated information of the bearing on the display unit 155, the fact that the precision of the information of the bearing displayed on the display unit 155 is low is displayed on the display unit 155.

The signal processing/control unit 160 detects a change of the open/closed state at step ST314, reads out the offset error correction data in accordance with the state after change at step ST306 or ST308 in accordance with this, then displays the fact that the precision of the information of the bearing displayed on the display unit 155 is low on the display unit 155 (ST320).

The signal processing/control unit 160 displays the information of the drop of precision of the bearing on the display unit 155 by a method such as making the image of a compass representing the bearing swing rightward and leftward, changing the shape, color, and size of the compass, or displaying another image indicating a drop of the precision of the bearing in the same way as step ST214 of FIG. 14.

The signal processing/control unit 160 displays information indicating a drop of precision of the bearing on the display unit 155 during the period of the correction of the earth-geomagnetism detection values (ST307/309) and the calculation of bearing (ST312). Then, when displaying the information of bearing after the correction on the display unit 155, the signal processing/control unit 160 displays the fact that the precision of the bearing has been restored on the display unit 155 (ST322). For example, when displaying a drop of precision of the bearing by movement swinging the image of a compass rightward and leftward, it may stop this rightward and leftward swinging. When displaying the drop of precision of the bearing by changing the shape, color, and size of the image of the compass, it may return the image to the original state. Alternatively, it is possible to display another image indicating the restoration of the precision of the information of the bearing.

As described above, according to the example of the processing for calculation of the bearing shown in FIG. 16, when the correction values of the earth-geomagnetism detection values change due to a change of the open/closed state of the housings 2 and 3, during the period until recalculating the bearing by the new correction values and displaying the results on the display unit 155, the fact that the precision of the information of the bearing being displayed is low can be notified to the user. Due to this, the user becomes able to correctly grasp whether or not the precision of the information of the bearing being displayed is low.

Figure 17:
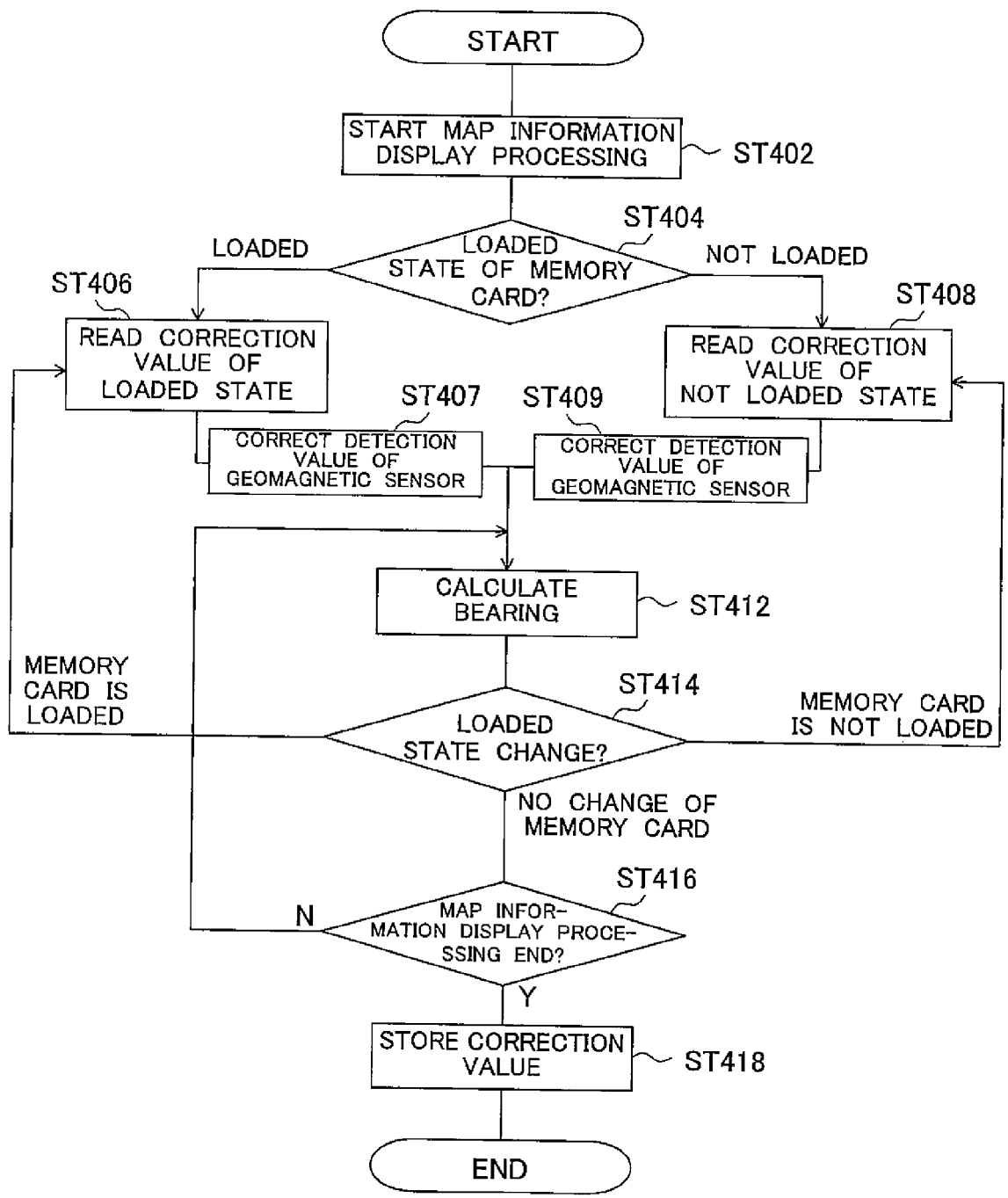
FIG. 17 is a flow chart illustrating a fifth example of processing for calculation of the bearing in a mobile cellular phone.

FIG. 17 is a flow chart illustrating an example of the processing for calculation of the bearing in the cellular phone 100.

In the processing for calculation of the bearing of the example of FIG. 15 and FIG. 16 explained above, a change of the earth-geomagnetism detection values occurring due to an event such as the change of the open/closed state of the housings 2 and 3 is corrected, but in a fifth example explained next, a change of the earth-geomagnetism detection values due to the occurrence of an event such as loading of a memory card in the memory card unit 159 is corrected.

When the memory card uses parts which are easily magnetized such as the lead frame of a semiconductor integrated device, due to the influence of this magnetism, the offset error of the geomagnetic sensor 158 at the time of the loading and nonloading of the memory card changes in certain cases.

Figure 18:
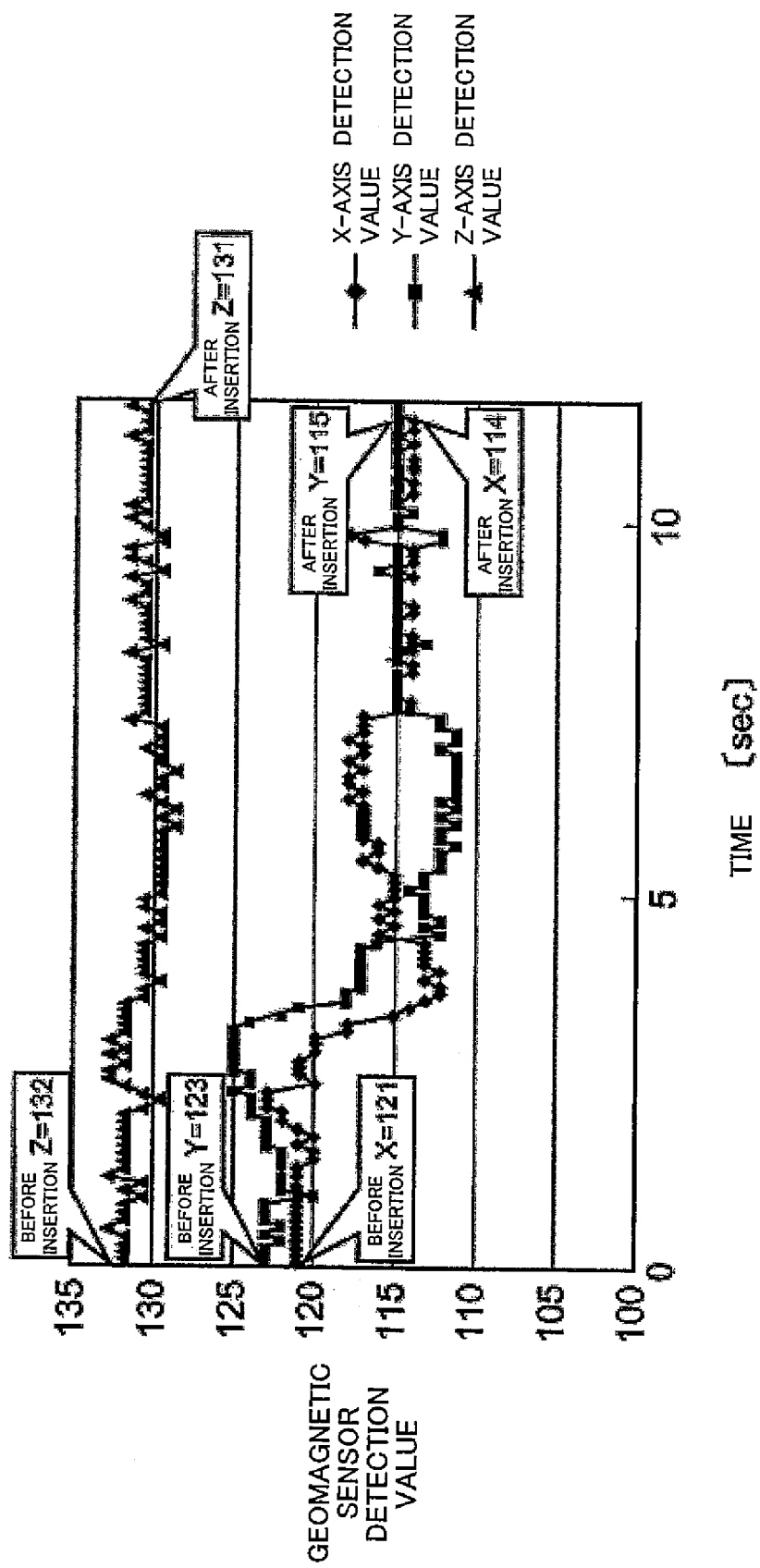
FIG. 18 is a diagram showing an example of changes in a geomagnetic sensor detection value along with time in accordance with presence of a loaded memory card.

FIG. 18 is a diagram showing an example of the change over time of the geomagnetic sensor detection values (X-axis, Y-axis, Z-axis) in accordance with loading of a memory card. In the example of FIG. 18, the X-axis, Y-axis, and Z-axis geomagnetic sensor detection values change by exactly "−7", "−8", and "−1".

In the processing for calculation of the bearing of the example of FIG. 17, in order to reduce the error of the bearing due to such changes of the geomagnetic sensor detection values, the correction values of the offset error obtained by the processing for correction of offset error are separately held for each of the events of the loading of the memory card and the nonloading of the memory card. Then, when the loaded state of the memory card of the case changes, the correction values used for the correction of the offset error are changed matching with this.

When the start of the position finding processing is selected by the key input operation etc. at the key input unit 154, the signal processing/control unit 160 activates the geomagnetic sensor 158 and acquires the information of the bearing (ST402) and checks the loaded state of the memory card in the memory card unit 159 (ST404). When it is judged that the memory card is loaded by the signal from the memory card unit 159, the signal processing/control unit 160 reads out the offset error correction data of the time of the loading of the memory card held in for example a not shown register in the signal processing/control unit 160 (ST406) and corrects the detection values of the geomagnetic sensor 158 based on this (ST407). Further, when it is judged that the memory card is not loaded by the signal by the signal from the memory card unit 159, the signal processing/control unit 160 reads out the offset error correction data of the time of the nonloading of the memory card held in the not shown register in the signal processing/control unit 160 (ST408) and corrects the detection values of the geomagnetic sensor 158 based on this (ST409).

The offset error correction data of the time of the loading and the time of the nonloading of the memory card is comprised of three correction values corresponding to the magnetic detection values in the three directions as shown in for example FIG. 18. These correction values are frequently acquired at the time of the start of the position finding processing or the execution thereof by the processing for correction of offset error explained later and written into predetermined registers in the signal processing/control unit 160 provided for each of the time of loading and the time of nonloading of the memory card. The offset error correction data stored in the register is rewritten whenever the processing for correction of offset error is executed and new correction values are acquired.

When correcting the detection values of the geomagnetic sensor 158, the signal processing/control unit 160 calculates the bearing by using the earth-geomagnetism detection values after this correction (ST412).

Then, the signal processing/control unit 160 confirms the loaded state of the memory card in the memory card unit 159 again to check whether or not the loaded state changes (ST414).

When detecting a change from a state where the memory card is not loaded in the memory card unit 159 to a state where the memory card is loaded in the memory card unit 159, the signal processing/control unit 160 returns to step ST406 where it reads out the offset error correction data of the time of the loading of the memory card and repeats the correction of the earth-geomagnetism detection values and the calculation of the bearing by using this (ST407, ST412). When detecting a change from a state where the memory card is loaded in the memory card unit 159 to a state where the memory card is not loaded in the memory card unit 159, the signal processing/control unit 160 returns to step ST408 where it reads out the offset error correction data of the time of nonloading of the memory card and repeats the correction of the earth-geomagnetism detection values and the calculation of the bearing by using this (ST409, ST412).

When there is no change in the loaded state of the memory card, the signal processing/control unit 160 confirms whether or not the end of the position finding processing is selected (ST416). When the position finding processing continues, it repeats the correction of the earth-geomagnetism detection values and the calculation of the bearing by using the offset error correction data in use at present (ST407/409, ST412).

When the end of the position finding processing is selected, the signal processing/control unit 160 stores the offset error correction data at the time of the loading of the memory card and the time of the nonloading of the memory card held in the registers in the storage unit 152 (ST418). Due to this, when the position finding processing is carried out the next time, it becomes possible to smoothly perform the calculation of the bearing by using the offset error correction data stored in the storage unit 152.

As described above, according to the example of the processing for calculation of the bearing shown in FIG. 17, the change of the loaded state of the memory card in the memory card unit 159 is monitored when the information of the bearing is displayed on the display unit 155, and when a change is detected, the information of the bearing displayed on the display unit 155 is corrected in accordance with the state after the change (loading or nonloading). Namely, when a change is detected in the loaded state of the memory card, the predetermined correction corresponding to the state after the change is carried out for the detection values of the geomagnetic sensor 158, and the bearing is calculated based on the earth-geomagnetism detection values after this correction.

Accordingly, even when the detection values of the geomagnetic sensor 158 change due to the change of the loaded state of the memory card, and the precision of the information of the bearing displayed on the display unit 155 is lowered, by detecting the change of the loaded state of the memory card in the memory card unit 155 and correcting the information of the bearing, the precision of the information of the bearing can be restored.

Further, the offset error correction data in the loaded state and the unloaded state are separately held in predetermined registers of the signal processing/control unit 160, and the correction of the information of the bearing is carried out by using the suitable offset error correction data in accordance with the loaded state of the memory card, therefore the information of the bearing can be corrected with a high precision in each state.

Figure 19:
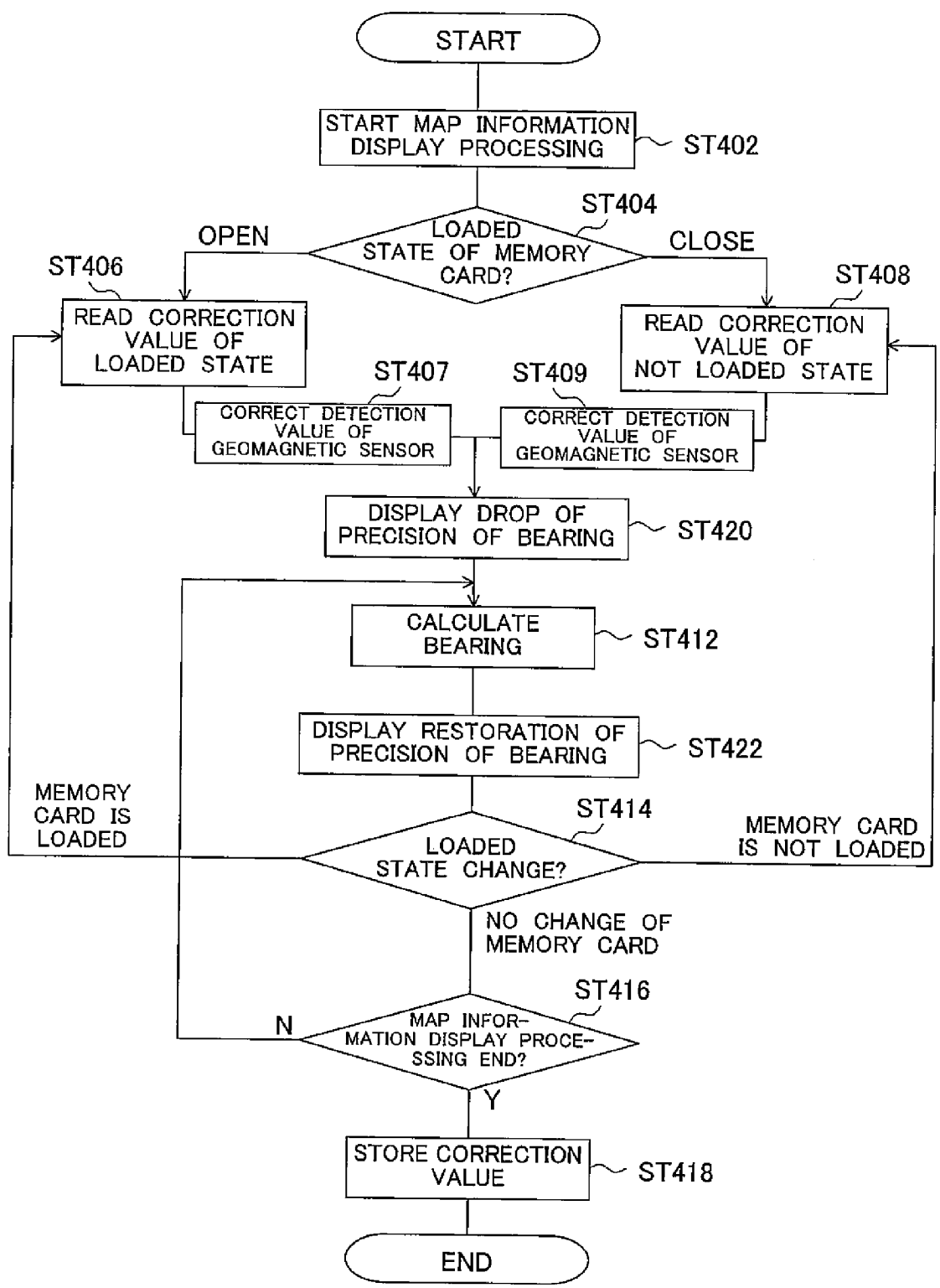
FIG. 19 is a flow chart illustrating a sixth example of processing for calculation of the bearing in a mobile cellular phone.

FIG. 19 is a flow chart illustrating an example of the processing for calculation of the bearing in the cellular phone 100.

The difference of FIG. 19 from FIG. 17 explained above resides in the point during the period from the detection of the event of the change of the loaded state of the memory card to the recalculation of the bearing and the display of the recalculated information of the bearing on the display unit 155, the fact that the precision of the information of the bearing displayed on the display unit 155 is low is displayed on the display unit 155.

The signal processing/control unit 160 detects the change of the memory card loaded state at step ST414 and reads out the offset error correction data in accordance with the state after the change at step ST406 or ST408 in accordance with this, then makes the display unit 155 display the fact that the precision of the information of the bearing displayed on the display unit 155 is low (ST420).

The signal processing/control unit 160 displays information indicating such a drop of precision of the bearing on the display unit 155 during the period of the correction of the earth-geomagnetism detection values (ST407/ST409) and the calculation of bearing (ST412). Then, when displaying the information of the bearing after the correction on the display unit 155, the signal processing/control unit 160 displays the restoration of the precision of the bearing on the display unit 155 (ST422).

For example, when displaying a drop of the precision of the bearing by movement swinging the image of the compass rightward and leftward, it is possible to suspend this rightward and leftward swinging. When displaying a drop of the precision of the bearing by changing the shape, color, and size of the image of compass, it is possible to return this to the original state. Alternatively, it is possible to display another image indicating the restoration of the precision of the information of the bearing.

As described above, according to the example of the processing for calculation of the bearing shown in FIG. 19, when the correction values of the earth-geomagnetism detection values change due to a change of the loaded state of the memory card, during the period until recalculation of the bearing by the new correction values and display of the results on the display unit 155, the fact that the precision of the bearing being displayed is low can be notified to the user. Due to this, the user becomes able to correctly grasp whether or not the precision of the information of bearing being displayed is low.

Processing for Correction of Offset Error

The processing for correction of offset error is processing for correcting error of the constant earth-geomagnetism detection values occurring due to a magnetic field generation source inside the cellular phone 100.

The static magnetic field generated inside the cellular phone 100 causes constant error not dependent on the bearing in which the cellular phone 100 is oriented in the detection values of the geomagnetic sensor 158. Contrary to this, the detection values of the earth-geomagnetism per se change in accordance to the bearing in which the cellular phone 100 is oriented. Accordingly for example, by detecting the earth-geomagnetism while rotating the cellular phone 100 and finding the path of the vector of the earth-geomagnetism in accordance with the rotation of the cellular phone 100, the offset error included in the detection values of the geomagnetic sensor 158 can be easily calculated.

The signal processing/control unit 160 displays an instruction on the display unit 155 prompting the user to rotate the cellular phone 100 when starting the position finding processing. When the user rotates the cellular phone 100 according to this instruction, the signal processing/control unit 160 acquires a plurality of detection values of the geomagnetic sensor 158 in the middle of the rotation, calculates the offset error difference from the vector paths of the acquired earth-geomagnetism detection values, and subtracts it from the detection values of the geomagnetic sensor 158. Due to this, earth-geomagnetism detection values in which the offset error is corrected are obtained.

The signal processing/control unit 160 stores the offset error calculated by the processing for correction of offset error as explained above as the offset error correction data in a predetermined register of the signal processing/control unit 160.

The signal processing/control unit 160 performs the above processing for correction of offset error for each constant time even during a period where the position finding processing is executed.

The signal processing/control unit 160 performs the processing for correction of offset error and performs the correction of the earth-geomagnetism detection values even in the case where the detection values of the geomagnetic sensor 158 become a predetermined abnormal state such as overflow as will be explained next.

Figure 20:
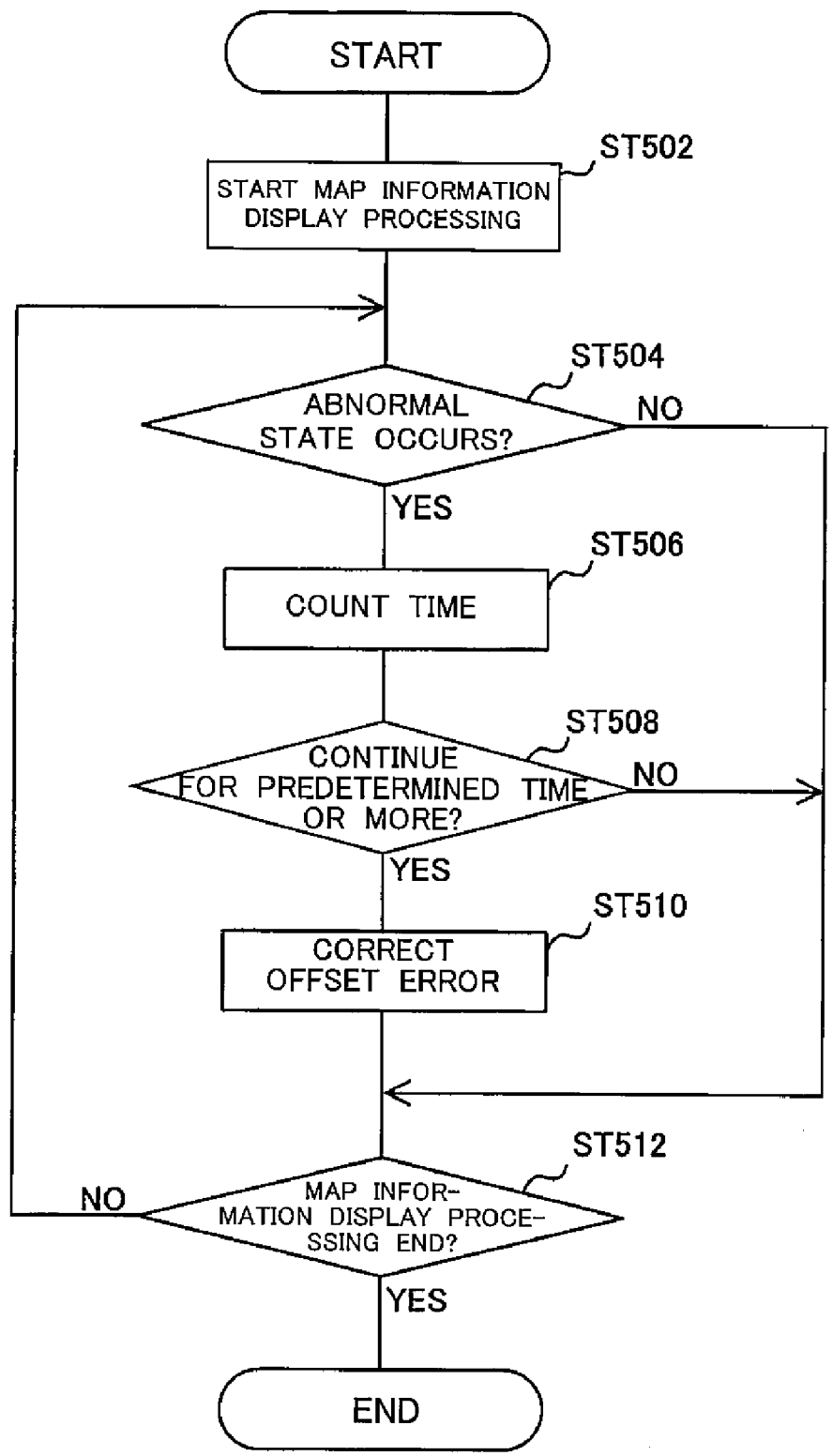
FIG. 20 is a flow chart illustrating a first example of processing for correction of offset error in a case where an abnormal state occurs in a earth-geomagnetism detection value.

FIG. 20 is a flow chart illustrating an example of the processing for correction of offset error in the case where an event of the occurrence of an abnormal state in the earth-geomagnetism detection values occurs.

When the start of the position finding processing is selected by the key input operation etc. at the key input unit 154 (ST502), the signal processing/control unit 160 checks whether or not the detection values of the geomagnetic sensor 158 have become a predetermined abnormal state (ST504).

Here, the "predetermined abnormal state" means for example the state where overflow occurs in any of the 8 bits of the detection values expressed by whole number values of from "0" to "255" (that is any of the X-axis, Y-axis, and Z-axis earth-geomagnetism detection values) and the values thereof become the maximum value "255" or the minimum value "0". Further, where a normal range having an upper limit value and a lower limit value is prescribed, any one of the earth-geomagnetism detection values being out of this normal range may be defined as the abnormal state.

When detecting such a abnormal state of earth-geomagnetism detection values, the signal processing/control unit 160 counts the time during which the abnormal state continues from a point of time of the detection (ST506). Where the abnormal state continues for a predetermined time (for example 5 seconds), the signal processing/control unit 160 judges that the offset error occurs by magnetization etc. of the cellular phone 100 and executes the above processing for correction of offset error (ST510).

After the processing for correction of offset error, the signal processing/control unit 160 checks whether or not the end of the position finding processing is selected. When it confirms that the processing continues, it repeats the processing for steps St504 to ST510 explained above (ST512).

Further, in a case where an abnormal state of the earth-geomagnetism detection values is not detected at step ST504 or a case where it is judged at step ST508 that the abnormal state of all detection values is solved within a predetermined time, it signal processing/control unit 160 confirms the continuation of the position finding processing in the same way, then repeats the processing for steps ST504 to ST510 (ST512).

As described above, according to the first example of the processing for correction of offset error shown in FIG. 20, in the case where the detection values of the geomagnetic sensor 158 become a predetermined abnormal state and this abnormal state continues for a predetermined time when displaying the information of the bearing on the display unit 155, the correction of the information of the bearing is carried out. Namely, when any one (or a plurality of) detection values of earth-geomagnetism in the three directions becomes a predetermined abnormal state and this abnormal state continues for a predetermined time, the processing for detecting the offset error of the geomagnetic sensor 158 and correcting this (processing for correction of offset error) is carried out, and the bearing is re-calculated based on the earth-geomagnetism detection values after this correction. Accordingly, by monitoring for any abnormality of the detection values of the geomagnetic sensor 158, the occurrence of the offset error of the cellular phone 100 is detected and suitable correction is carried out, therefore a drop of precision of the information of bearing due to offset error can be suppressed.

Further, according to the processing of FIG. 20, the processing for correction of offset error is carried out when the earth-geomagnetism detection values becomes a predetermined abnormal state continuously over a predetermined time. For this reason, cases where a temporary abnormal state of earth-geomagnetism detection values occurring due to the influence of external magnetic fields generated from for example a building or train is erroneously judged as offset error occurring due to the magnetization etc. of the cellular phone 100 and the unsuitable processing for correction of offset error is executed can be reduced.

Figure 21:
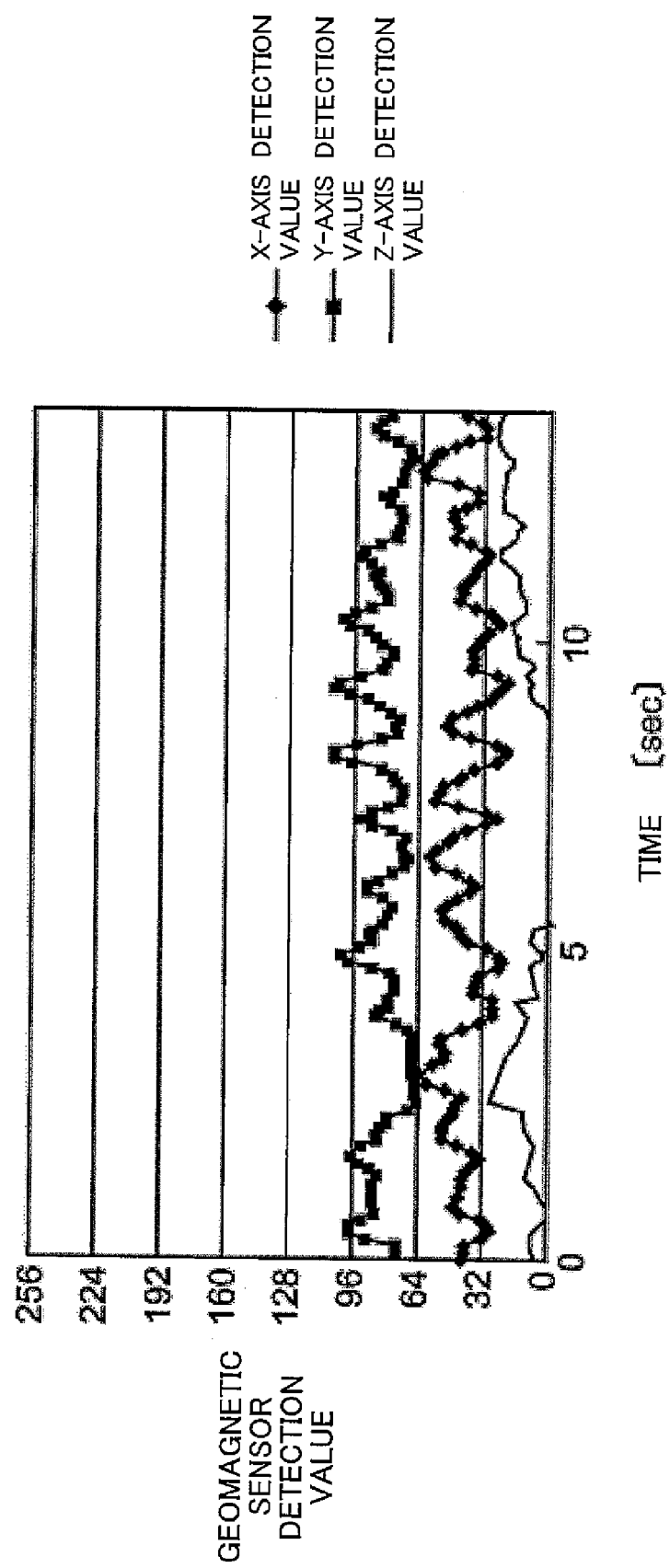
FIG. 21 is a diagram showing an example of the abnormal state of a earth-geomagnetism detection value occurring due to influence of an external magnetic field.

FIG. 21 is a diagram showing an example of the abnormal state of the earth-geomagnetism detection values occurring due to the influence of the external magnetic fields. In the example of the same diagram, the Z-axis direction earth-geomagnetism detection value is stuck at "0" over a time of 3 to 4 seconds. When the processing for correction of offset error is executed when such a temporary abnormality due to the external magnetic fields occurs, the offset error cannot be correctly calculated, therefore the correction of the magnetic detection values is carried out with the erroneous correction values, and the result of calculation of the bearing becomes incorrect as a result. The incorrect state of the bearing continues at least up to the next processing for correction of the offset error.

As shown in FIG. 21, the abnormal state of the earth-geomagnetism detection values due to the influence of the external magnetic fields is usually transitional lasting just a few seconds and returns to the normal state within for example 5 seconds in many cases.

Accordingly, as in the processing for FIG. 20, by distinguishing between an abnormal state occurring due to the influence of the external magnetic field and the offset error in accordance with whether or not the abnormal state continues for the predetermined time or more and controlling the execution of the processing for correction of offset error according to the result of this, the unsuitable execution of the correction processing can be effectively prevented.

Figure 22:
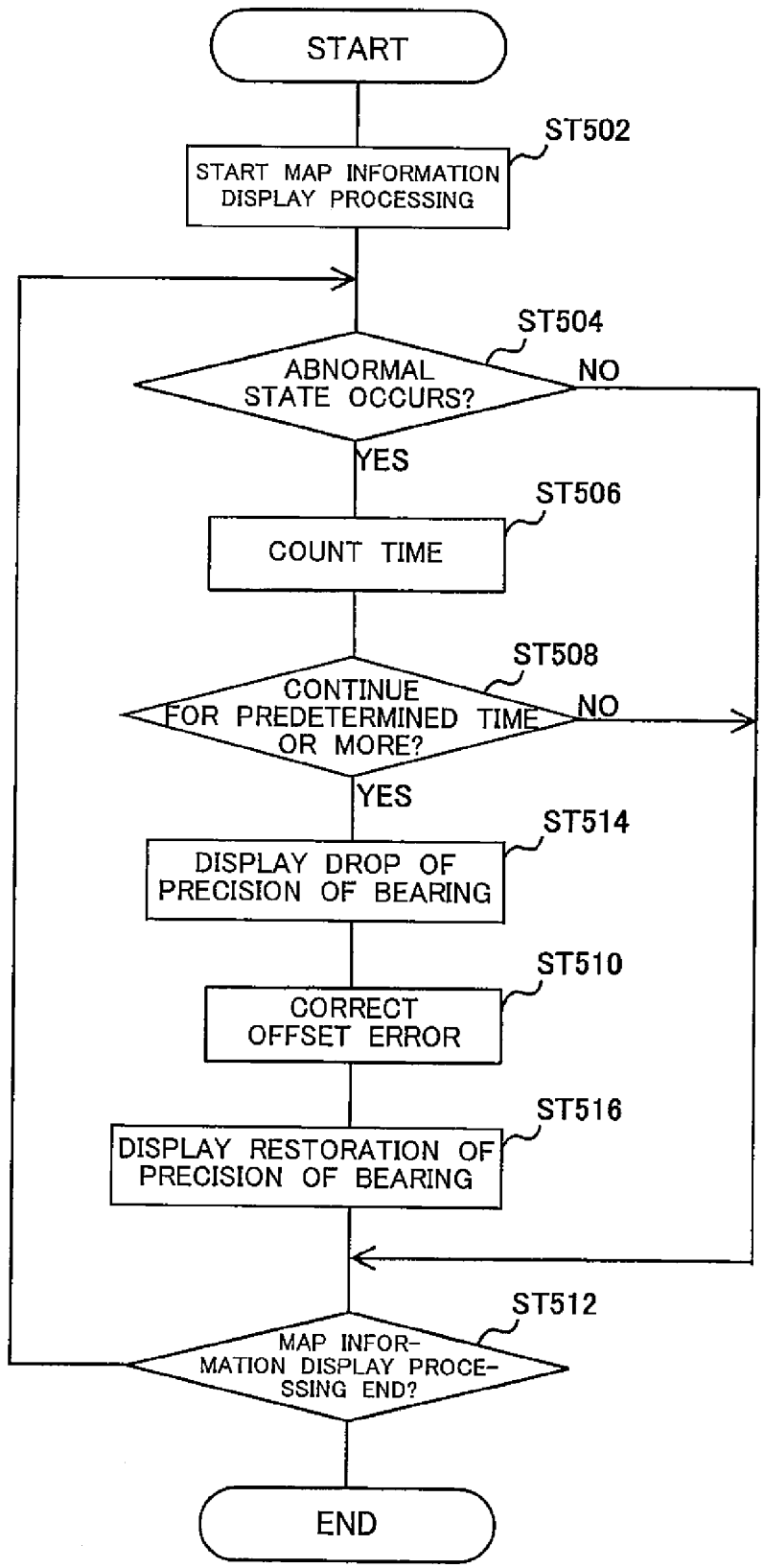
FIG. 22 is a flow chart illustrating a second example of processing for correction of offset error in a mobile cellular phone.

FIG. 22 is a flow chart illustrating an example of the processing for correction of offset error in the cellular phone 100.

The difference of FIG. 22 from FIG. 20 explained above resides in a point that the fact that the precision of the information of bearing is low is displayed on the display unit 155 during a period of correction of the information of the bearing.

The signal processing/control unit 160 makes the display unit 155 display the fact that the precision of the information of the bearing displayed on the display unit 155 is low after judging that an abnormality of the earth-geomagnetism detection values continues for a predetermined time or more at step ST508 (ST514).

The signal processing/control unit 160 displays the information indicating such a drop of precision of the bearing on the display unit 155 during the period of the processing for correction of offset error (ST510). Then, when displaying the information of the bearing recalculated based on the earth-geomagnetism detection values after the correction on the display unit 155, the signal processing/control unit 160 displays the restoration of the precision of the bearing on the display unit 155 (ST516).

For example, when displaying a drop of the precision of the bearing by movement swinging the image of the compass rightward and leftward, it is possible to suspend this rightward and leftward swinging. When displaying a drop of the precision of the bearing by changing the shape, color, and size of the image of compass, it is possible to return this to the original state. Alternatively, it is possible to display another image indicating the restoration of the precision of the information of the bearing.

As described above, according to the second example of the processing for correction of offset error shown in FIG. 22, during the period of the correction of the information of the bearing along with an abnormality of the earth-geomagnetism detection values, the fact that the precision of the information of the bearing displayed on the display unit 155 is low can be notified to the user. Due to this, the user becomes able to correctly grasp whether or not the precision of the information of the bearing being displayed is low.

Figure 23:
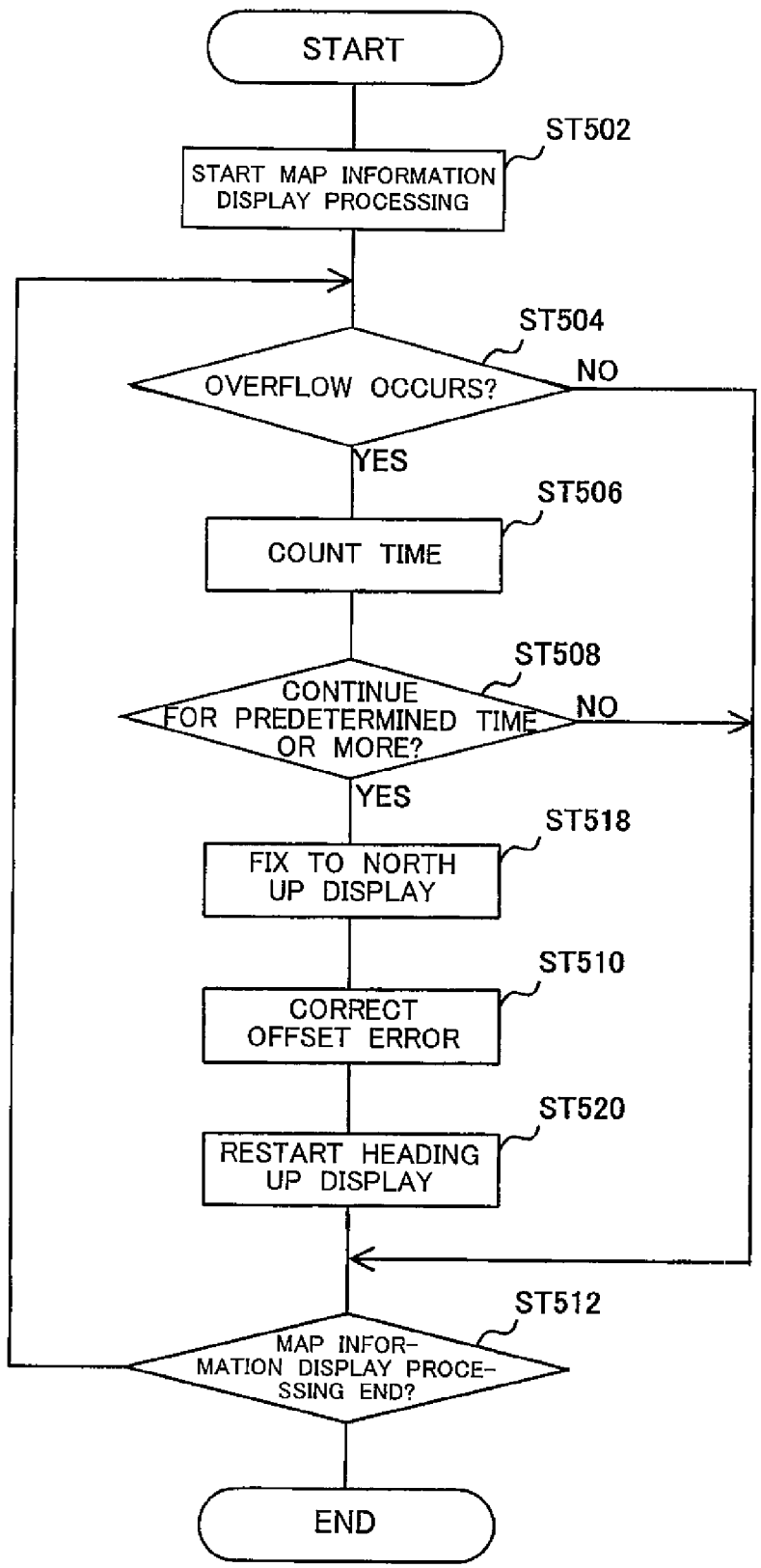
FIG. 23 is a flow chart illustrating a third example of processing for correction of offset error in a mobile cellular phone.

FIG. 23 is a flow chart illustrating an example of the processing for correction of offset error in the cellular phone 100.

The difference of FIG. 23 from FIG. 22 explained above resides in that the display of the map is fixed from the heading up display to the north up display during the period of the correction of information of the overflow bearing explained above and the heading up display is re-started when the correction of the information of the bearing is completed.

When judging at step ST508 that an abnormality of the magnetic detection values continues for a predetermined time or more, the signal processing/control unit 160 fixes the display of the map from the heading up display to the north up display (ST518). During the period of the processing for correction of offset error (ST510), it continues the north up display. Then, when the bearing is re-calculated based on the earth-geomagnetism detection values after this correction, the signal processing/control unit 160 releases the north up display and re-starts the heading up display (ST520).

As described above, even in the example of the processing for correction of offset error shown in FIG. 23, by fixing the display of the map to the north up display during the period of correction of the information of the bearing along with the occurrence of the event of the detection of an abnormality of the earth-geomagnetism detection value, the fact that the precision of the information of the bearing displayed on the display unit 155 is low can be notified to the user. Due to this, the user becomes able to correctly grasp whether or not the precision of the information of the bearing being displayed is low.

Correction of Error Due to Influence of External Magnetic Field

Next, the processing in the case where an error occurs in the detection values of the geomagnetic sensor 158 due to the influence of the external magnetic field, and the precision of the information of the bearing is lowered will be explained.

In general, buildings, trains, etc. include many sources of generation of magnetic fields, therefore, in the insides and surroundings thereof, a big error occurs in the detection values of the geomagnetic sensor 158 due to the influence of the external magnetic fields from these magnetic field generation sources. If the processing for correction of offset error is executed in such an area, erroneous offset error is calculated, therefore, even after the user leaves this area, until he performs the processing for correction of offset error again, the information of the incorrect bearing is displayed on the display unit 155 as it is.

Therefore, in the processing explained below, when it is detected that the user has entered into an area where error occurs in the detection values of the geomagnetic sensor 158 due to the influence of external magnetic fields etc., the processing for correction of offset error is prohibited. Further, the drop of the precision of the information of the bearing is displayed on the display unit 155, and the judgment of whether or not the user should use the information of the bearing as a reference is enabled.

Figure 24:
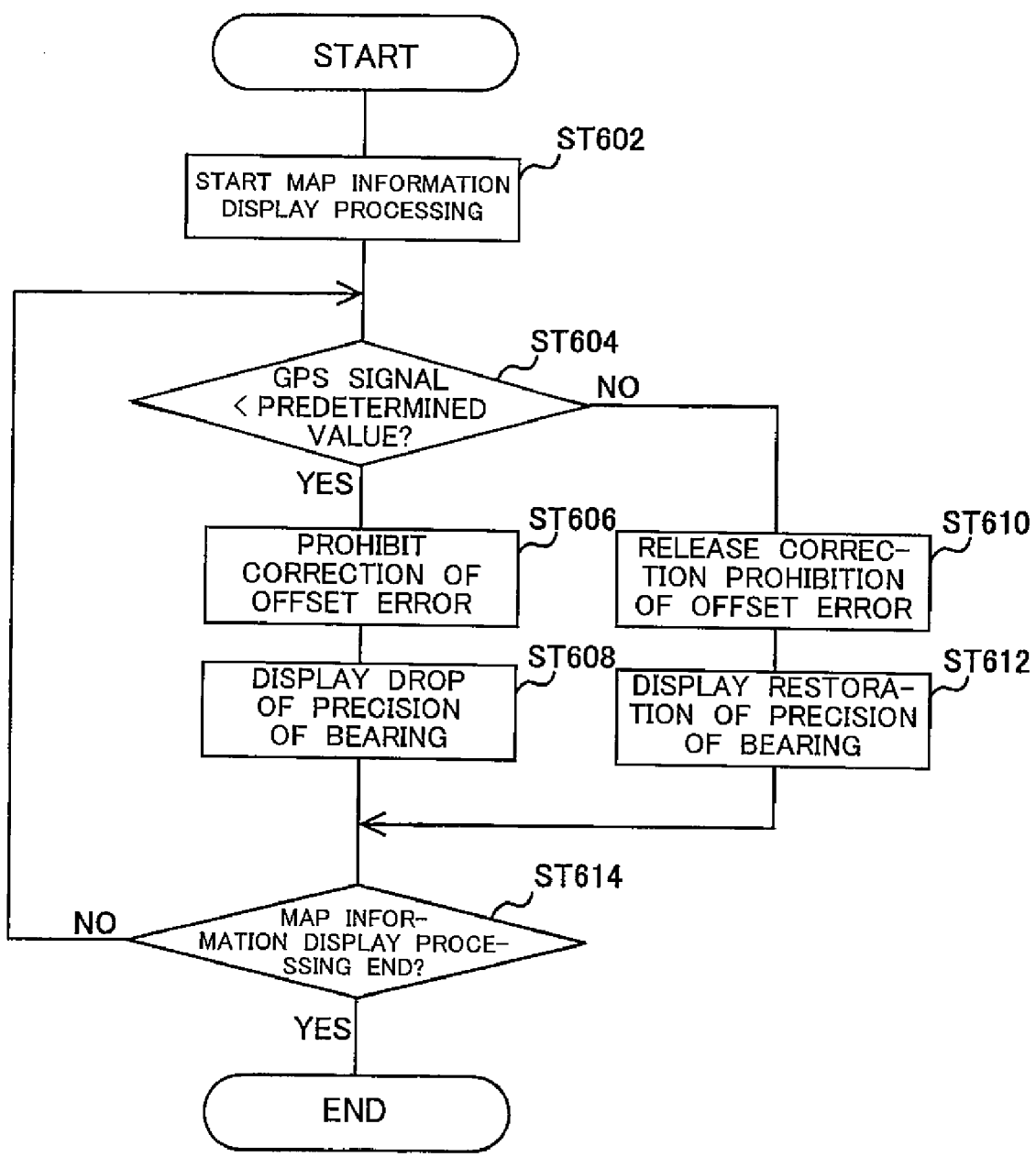
FIG. 24 is a flow chart illustrating a first example of processing in a case where an error occurs in a earth-geomagnetism detection value due to the influence of an external magnetic field.

FIG. 24 is a flow chart illustrating an example of the processing in the case where error occurs in the earth-geomagnetism detection values due to the influence of external magnetic fields.

When the start of the position finding processing is selected by a key input operation etc. at the key input unit 154, the signal processing/control unit 160 activates the geomagnetic sensor 158 and acquires the information of the bearing (ST602) and checks whether or not the level of the GPS signals received at the GPS signal receiver 151 is lower than a predetermined value (ST604).

Usually, the level of the GPS signals becomes very small, even to a non receivable level, when the cellular phone 100 enters into a building. In the present example, by utilizing this nature, it is judged whether or not the cellular phone 100 has entered into the inside of a building.

When it is detected that the GPS signals become lower than a predetermined value, the signal processing/control unit 160 judges that the cellular phone 100 has entered into the inside of a building and prohibits the execution of the processing for correction of offset error explained above (ST606). For example, in the case where the correction processing is repeated each constant time, the correction processing is not carried out even after this constant time passes. In this case, the signal processing/control unit 160 makes the display unit 155 display the drop of the precision of the information of the bearing (ST608). For example, the signal processing/control unit 160 makes the display unit 155 display the information of the drop of the precision of the bearing by for example the method of swinging the image of a compass representing the bearing rightward and leftward, changing the shape, color, size etc. of the compass, or displaying another image representing the drop of precision of the bearing.

On the other hand, when it is detected that the GPS signals become higher than the predetermined value, the signal processing/control unit 160 judges that the cellular phone 100 has not entered into the inside of the building and releases the prohibition if the state where the execution of the processing for correction of offset error explained above is prohibited is exhibited (ST610). In this case, the signal processing/control unit 160 makes the display unit 155 display that the precision of the information of the bearing is restored (ST612). For example, when displaying a drop of the precision of the bearing by movement swinging the image of the compass rightward and leftward, it is possible to suspend this rightward and leftward swinging. When displaying a drop of the precision of the bearing by changing the shape, color, and size of the image of compass, it is possible to return this to the original state. Alternatively, it is possible to display another image indicating the restoration of the precision of the information of the bearing.

After step ST608 or ST612, the signal processing/control unit 160 checks whether or not the end of the position finding processing is selected. When it confirms that the processing continues, the signal processing/control unit 160 repeats the above processing for step ST604 and the following steps (ST614).

As described above, according to the example of the processing in the case where error occurs in the earth-geomagnetism detection values due to the influence of the external magnetic fields (FIG. 24), when the information of the bearing is displayed on the display unit 155, the level of the GPS signals received at the GPS signal receiver 151 is monitored. When it is detected that this level becomes lower than a predetermined value, it is judged that the cellular phone 100 has entered inside of a building, and information indicating that the precision of the information of the bearing on the display unit 155 is low is displayed on the display unit 155. Due to this, the user becomes able to correctly grasp whether or not the precision of the information of the bearing being displayed is low. For example, when the precision of the information of the bearing is low, it becomes clear to the user that the bearing must be predicted by another method, for example, comparing the information displayed on the map and the scene of the surroundings to determine the bearing without reference to the bearing displayed on the screen, therefore the user friendliness of the map information display processing function can be improved.

Further, the execution of the processing for correction of offset error is prohibited in an unsuitable area where the offset error cannot be correctly calculated due to the influence of external magnetic fields, for example, inside of a building, therefore the cases where the display unit 155 displays the incorrect bearing for a long time can be reduced.

Next, an example of the processing in the case where error occurs in the earth-geomagnetism detection values due to the influence of an external magnetic field will be explained with reference to the flow chart shown in FIG. 25.

Figure 25:
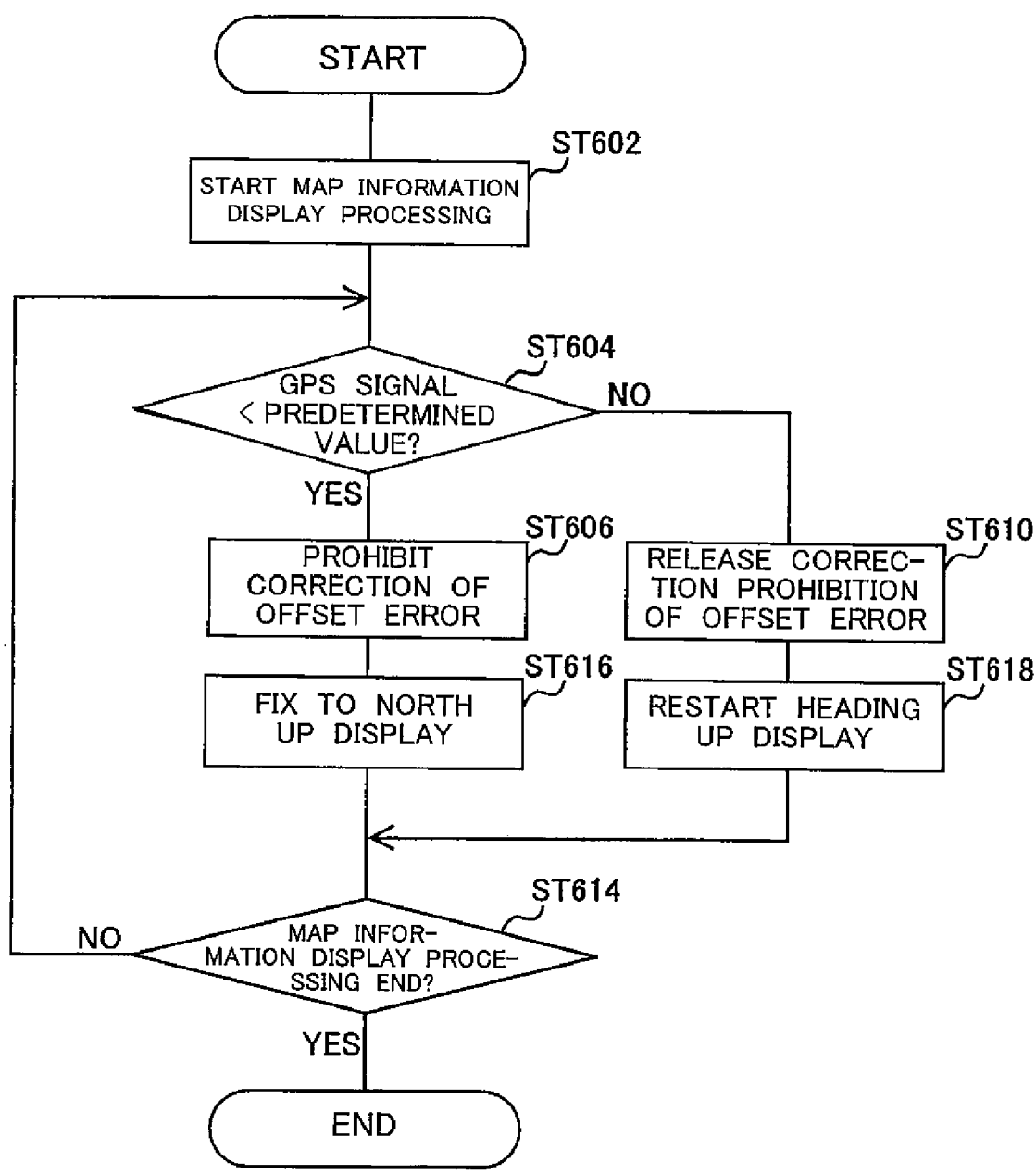
FIG. 25 is a flow chart illustrating a second example of processing in a case where an error occurs in a earth-geomagnetism detection value due to the influence of an external magnetic field.

The difference of FIG. 25 from FIG. 24 explained above resides in that the display of the map is fixed from the heading up display to the north up display when it is detected that the GPS signals become lower than a predetermined value and the heading up display is re-started when it is detected that the GPS signals become higher than the predetermined value.

When it is detected that the GPS signals become lower than the predetermined value at step ST604, the signal processing/control unit 160 prohibits the processing for correction of offset error (ST606) and, at the same time, fixes the display of the map from the heading up display to the north up display (ST616). Further, when it detects that the GPS signals become higher than the predetermined value at step ST604, the signal processing/control unit 160 releases the prohibition of the processing for correction of offset error (ST610) and, at the same time, releases the north up display and re-starts the heading up display (ST618).

As described above, according to the processing of the example shown in FIG. 25, in an area where the precision of the information of the bearing is lowered due to the influence of an external magnetic field such as inside of a building, by fixing the display of the map to the north up display, the fact that the precision of the information of the bearing displayed on the display unit 155 is low can be notified to the user. Due to this, the user becomes able to correctly grasp whether or not the precision of the information of the bearing being displayed is low.

Next, an example of the processing in the case where error occurs in the earth-geomagnetism detection values due to the influence of an external magnetic field will be explained with reference to the flow chart shown in FIG. 26.

Figure 26:
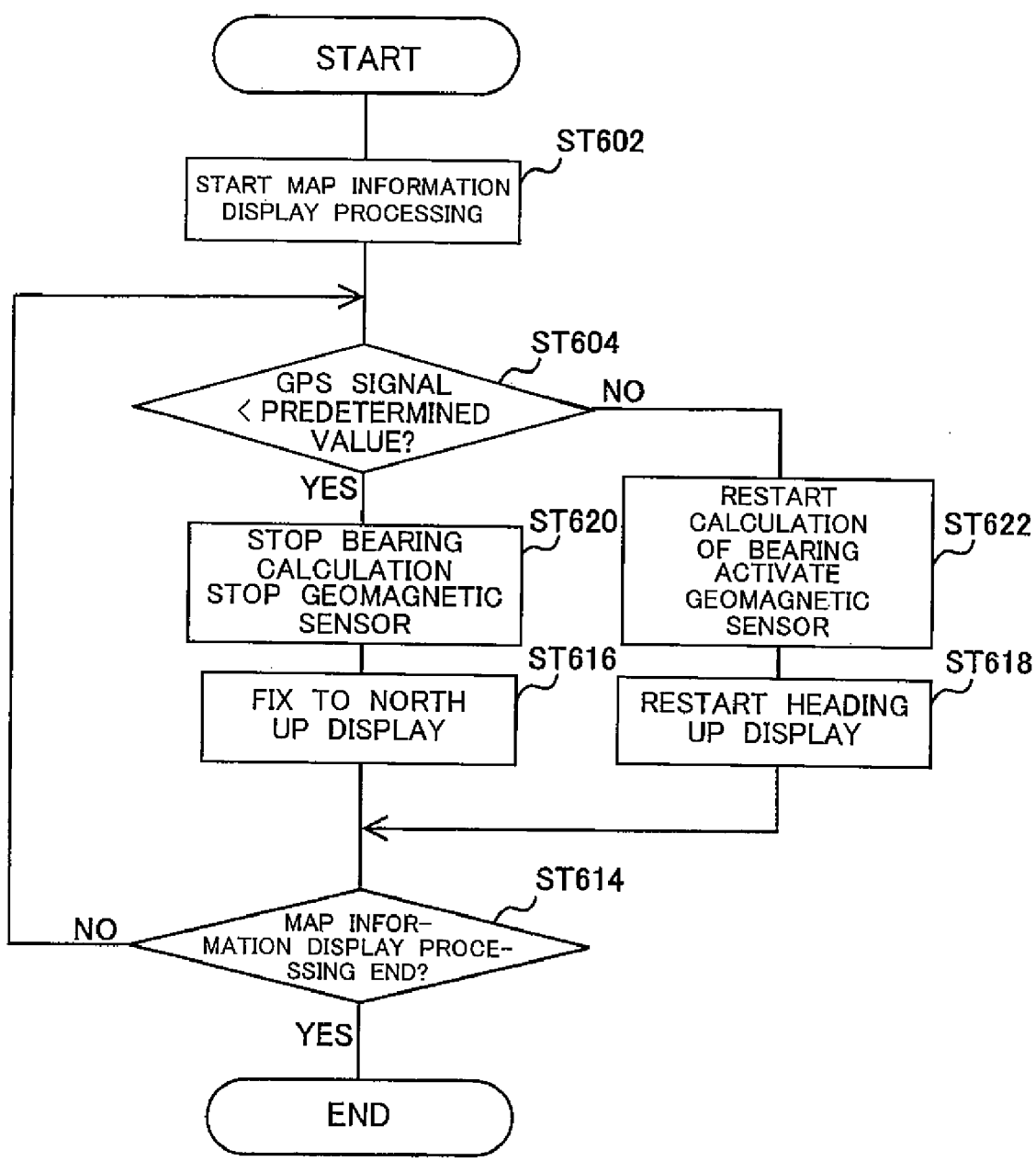
FIG. 26 is a flow chart illustrating a third example of processing in a case where an error occurs in a earth-geomagnetism detection value due to the influence of an external magnetic field.

The difference of FIG. 26 from FIG. 25 explained above resides in that when it is detected that the GPS signals become lower than a predetermined value, the processing for calculation of the bearing and the operation of the geomagnetic sensor 158 are suspended, while when it is detected that the GPS signals become higher than a predetermined value, these operations are restarted.

When it detects at step ST604 that the GPS signals become lower than the predetermined value, the signal processing/control unit 160 fixes the display of the map from the heading up display to the north up display (ST616) and, at the same time, suspends the processing for calculation of the bearing and the operation of the geomagnetic sensor 158 (ST620). When it detects at step ST604 that the GPS signals become higher than a predetermined value, the signal processing/control unit 160 releases the north up display and restarts the heading up display (ST618) and, at the same time, restarts the processing for calculation of the bearing and the operation of the geomagnetic sensor 158 (ST622).

The inside of a building etc. where it is originally hard to receive a GPS signal is also an environment easily influenced by external magnetic fields, but according to the processing of the example of FIG. 26 explained above, it is detected whether or not the cellular phone 100 is in such an environment in accordance with the level of the GPS signals and when it is, the operation of the geomagnetic sensor 158 is suspended, therefore the supply of wasted electric power to circuits which are not utilized in the cellular phone 100 is suppressed, and a reduction of the power consumption can be achieved.

Next, an example of the processing in the case where error occurs in the earth-geomagnetism detection values due to the influence of an external magnetic field will be explained with reference to the flow chart shown in FIG. 27.

Figure 27:
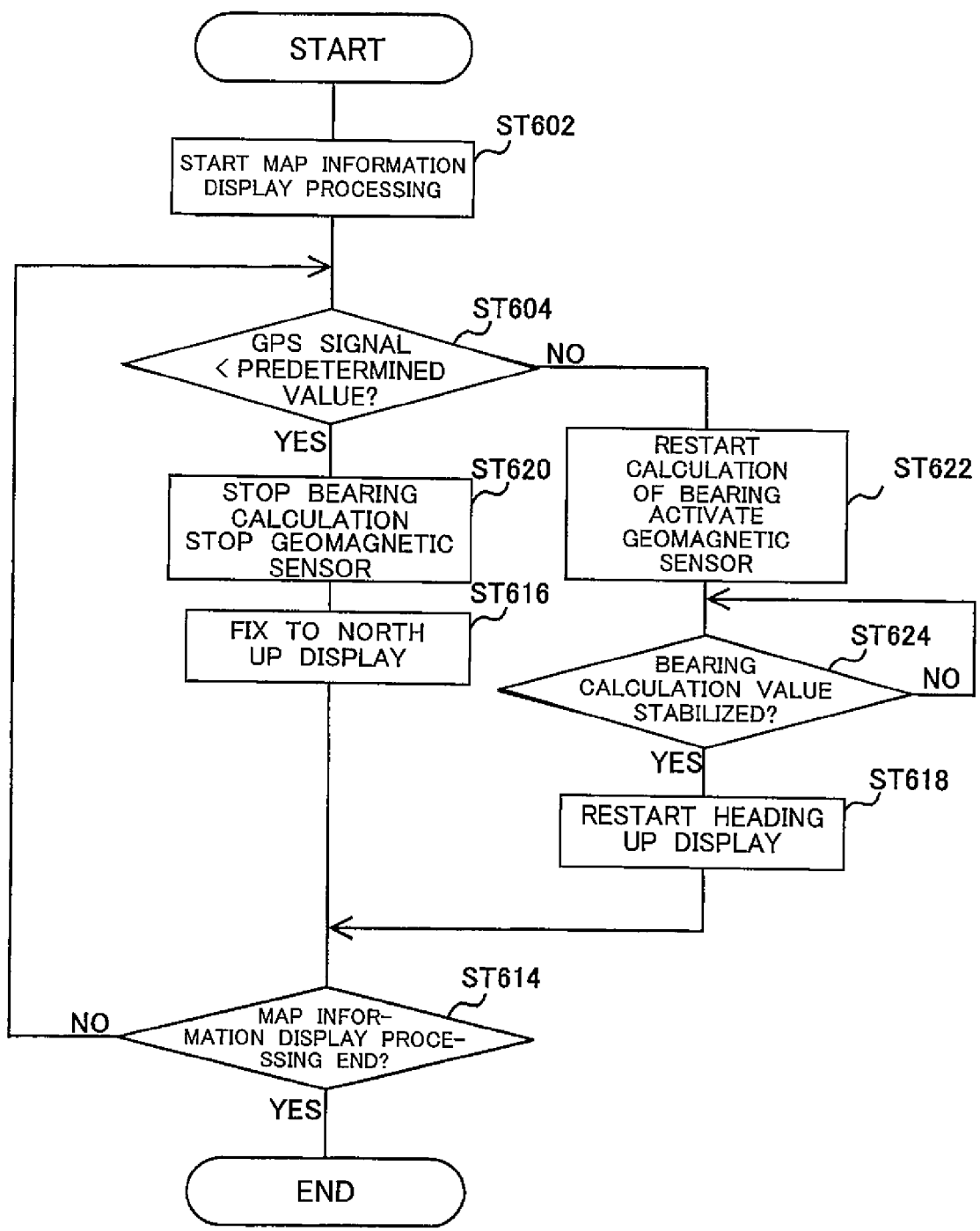
FIG. 27 is a flow chart illustrating a fourth example of processing in a case where an error occurs in a earth-geomagnetism detection value due to the influence of an external magnetic field.

The difference of FIG. 27 from FIG. 26 explained above resides in that the heading up display is restarted after the calculation value of the bearing is stabilized when it is detected that the GPS signals become higher than a predetermined value.

When detecting at step ST604 that the GPS signals become higher than the predetermined value, the signal processing/control unit 160 restarts the processing for calculation of the bearing and the operation of the geomagnetic sensor 158 (ST622), then judges whether or not the calculation value of the bearing becomes stable (ST624). For example, the signal processing/control unit 160 judges that the calculation value of the bearing is stabilized when the extent of change of the result of calculation of the bearing is within a predetermined range. After judging that the calculation value of the bearing is stabilized, the signal processing/control unit 160 releases the north up display and restarts the heading up display (ST618).

As described above, according to the processing for the example shown in FIG. 27, when the signal level of the GPS signals becomes higher than a predetermined value and it is judged that the cellular phone 100 has left the inside of the building etc., the heading up display is restarted after the stabilization of the calculation value of the bearing is confirmed. For this reason, the display of the information of the bearing having a low precision on the display unit 155 in for example the state where the change of the earth-geomagnetism detection values due to the magnetic fields from the building is large immediately after the cellular phone leaves the building can be prevented.

Next, an example of the processing in the case where error occurs in the earth-geomagnetism detection values due to the influence of external magnetic fields will be explained with reference to the flow chart shown in FIG. 28.

In the processing for the example explained above (FIG. 24 to FIG. 27), based on the reception level of the GPS signals, it is judged whether or not the cellular phone 100 has entered into a building, that is, whether or not the cellular phone 100 has entered into an area where error easily occurs in the detection of the earth-geomagnetism due to the influence of external magnetic fields.

In the processing for the example (FIG. 28) explained next, based on the information previously registered in the storage unit 152, it is judged whether or not the present position of the cellular phone 100 is included in a precision drop area causing a drop of precision of the detection values of the geomagnetic sensor 158. When it is judged that the present position is included in this area, the processing for correction of offset error is prohibited. Further, by making the display unit 155 display the drop of the precision of the information of the bearing, the judgment of whether or not the user should use the information of the bearing as a reference is enabled.

When the start of the position finding processing is selected by a key input operation etc. at the key input unit 154, the signal processing/control unit 160 activates the geomagnetic sensor 158 and acquires the information of the bearing (ST702) and judges whether or not the present position of the communication apparatus is included in a precision drop area registered in the storage unit 152 (ST704).

The information of the precision drop area registered in the storage unit 152 is comprised of for example an identification number sent from the navigation server system 402 and information of the coordinates of the precision drop area on this map (for example, information indicating the precision drop area on the map by a range of coordinates).

The signal processing/control unit 160 first retrieves the information of an identification number the same as the map being displayed at present from the information of the precision drop area registered in the storage unit 152. When the result of retrieval is that information of the same identification number exists, it is further judged whether or not the present position of the cellular phone 100 is included in the coordinate range of the precision drop area on the map indicated by the coordinate information. When the present position is included in this coordinate range, the signal processing/control unit 160 judges that the present position of the cellular phone 100 is included in the precision drop area.

When it is judged that the present position is included in the precision drop area, the signal processing/control unit 160 prohibits the execution of the above processing for correction of offset error (ST706). For example, when the correction processing is repeated each constant time, the correction processing is not carried out even after the elapse of this constant time. In this case, the signal processing/control unit 160 makes the display unit 155 display that the precision of the information of the bearing has fallen (ST708). For example, the information of the drop of precision of the bearing is displayed on the display unit 155 by for example the method of swinging the image of a compass representing the bearing rightward and leftward, changing the shape, color, size etc. of the compass, or displaying another image representing the drop of precision of the bearing.

On the other hand, when it is judged that the present position exists outside the precision drop area, the signal processing/control unit 160 releases this prohibition so far as the state where the execution of the processing for correction of offset error is prohibited is exhibited (ST710). In this case, the signal processing/control unit 160 makes the display unit 155 display that the precision of the information of the bearing is restored (ST712). For example, when displaying a drop of the precision of the bearing by movement swinging the image of the compass rightward and leftward, it is possible to suspend this rightward and leftward swinging. When displaying a drop of the precision of the bearing by changing the shape, color, and size of the image of compass, it is possible to return this to the original state. Alternatively, it is possible to display another image indicating the restoration of the precision of the information of the bearing.

After step ST708 or ST712, the signal processing/control unit 160 checks whether or not the end of the position finding processing is selected. When it confirms that the processing continues, the signal processing/control unit 160 repeats the processing for step ST704 and the following steps (ST714).

As described above, according to the example (FIG. 28) of the processing in the case where error occurs in the earth-geomagnetism detection values due to the influence of an external magnetic field, when displaying the information of the bearing on the display unit 155, the judgment of whether or not the present position of the cellular phone 100 is included in the precision drop area registered in the storage unit 152 is carried out. When the result of this judgment is that it is judged that the present position is included in the precision drop area, the information indicating that the precision of the information of the bearing on the display unit 155 is low is displayed on the display unit 155. Due to this, the user becomes able to correctly grasp whether or not the precision of the information of the bearing being displayed is low, therefore the user friendliness of the map information display processing function can be improved.

Further, the execution of the processing for correction of offset error is prohibited in the precision drop area where the offset error cannot be correctly calculated due to the influence of an external magnetic field, therefore the case of displaying the incorrect bearing on the display unit 155 over a long time can be reduced.

Next, a sixth example of the processing in the case where error occurs in the earth-geomagnetism detection values due to the influence of an external magnetic field will be explained with reference to the flow chart shown in FIG. 29.

Figure 28:
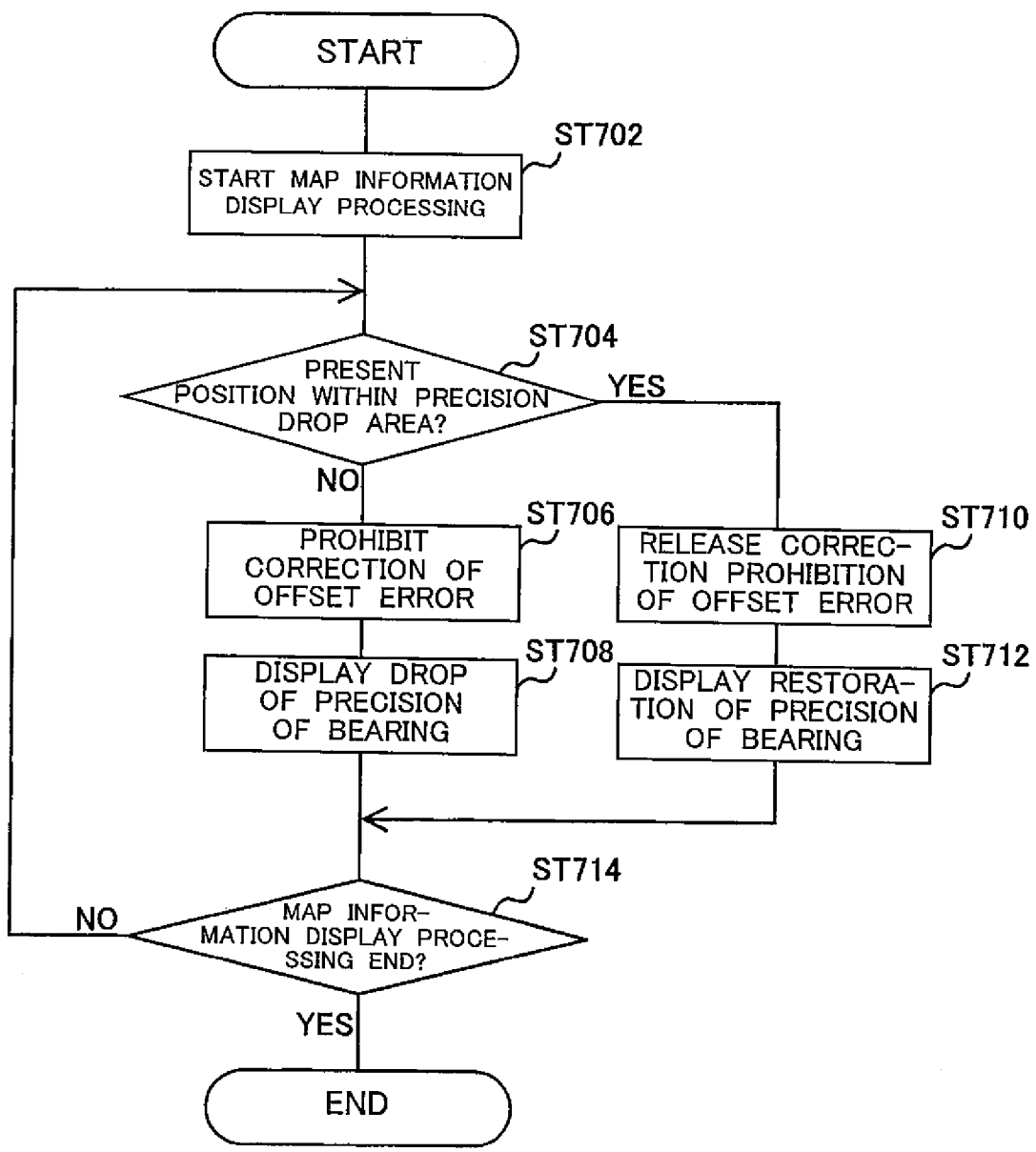
FIG. 28 is a flow chart illustrating a fifth example of processing in a case where an error occurs in a earth-geomagnetism detection value due to the influence of an external magnetic field.
Figure 29:
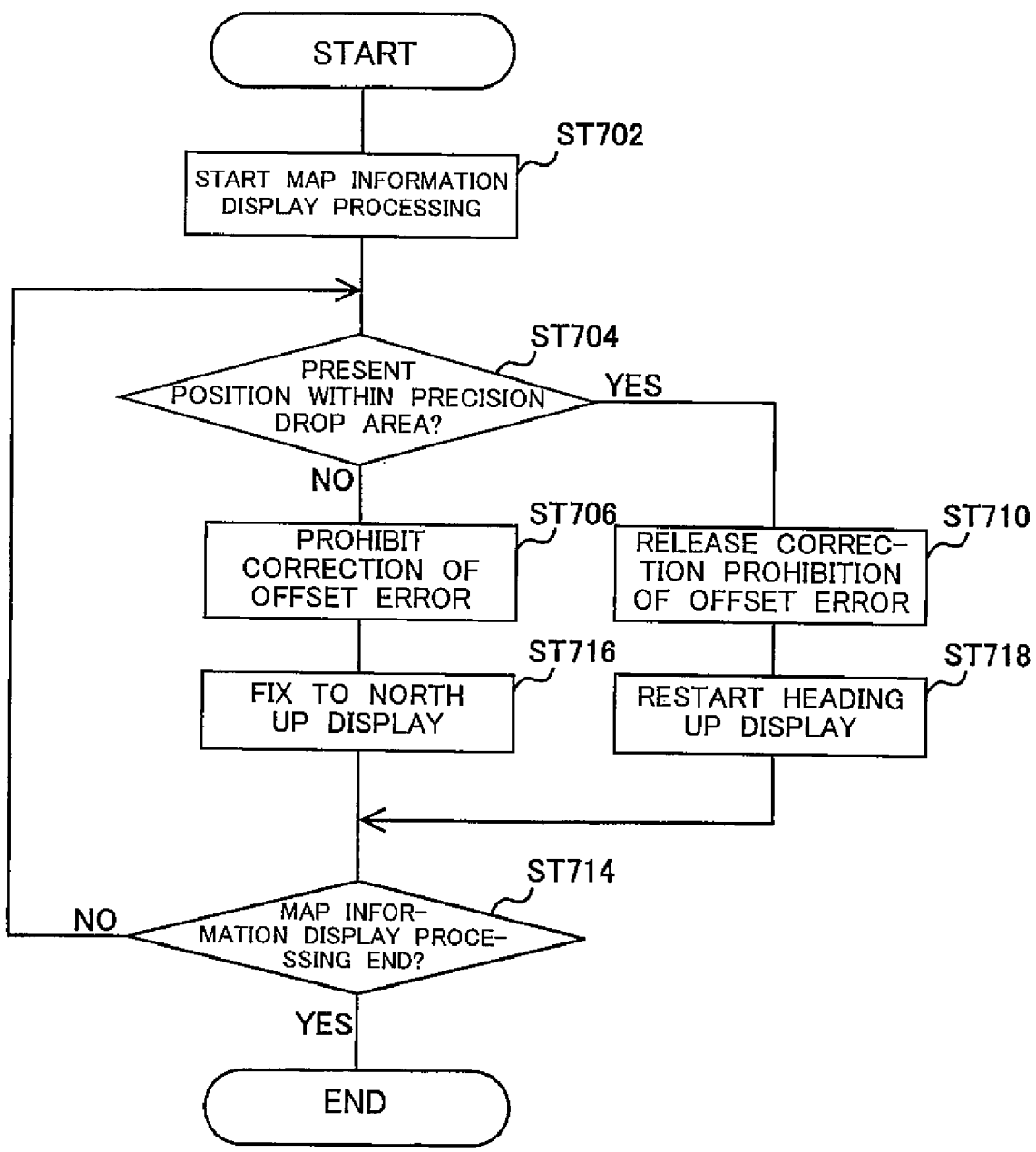
FIG. 29 is a flow chart illustrating a sixth example of processing in a case where an error occurs in a earth-geomagnetism detection value due to the influence of an external magnetic field.

The difference of FIG. 29 from FIG. 28 explained above resides in that the display of map is fixed from the heading up display to the north up display when it is judged that the present position is included in the precision drop area and the heading up display is restarted when it is judged that the present position moves out of the precision drop area.

When judging that the present position of the cellular phone 100 is included in the precision drop area at step ST704, the signal processing/control unit 160 prohibits the processing for correction of offset error (ST706) and, at the same time, fixes the display of the map from the heading up display to the north up display (ST716). When it is judged at step ST704 that the present position moves out of the precision drop area, the signal processing/control unit 160 releases the prohibition of the offset error correction value (ST710) and, at the same time, releases the north up display and restarts the heading up display (ST718).

As described above, according to the processing for the example shown in FIG. 29, in an area where the precision of the information of the bearing is lowered due to the influence of an external magnetic field, by fixing the display of the map to the north up display, the fact that the precision of the information of the bearing displayed on the display unit 155 is low can be notified to the user. Due to this, the user becomes able to correctly grasp whether or not the precision of the information of the bearing being displayed is low.

Next, an example of the processing in the case where error occurs in the earth-geomagnetism detection values due to the influence of an external magnetic field will be explained with reference to the flow chart shown in FIG. 30.

Figure 30:
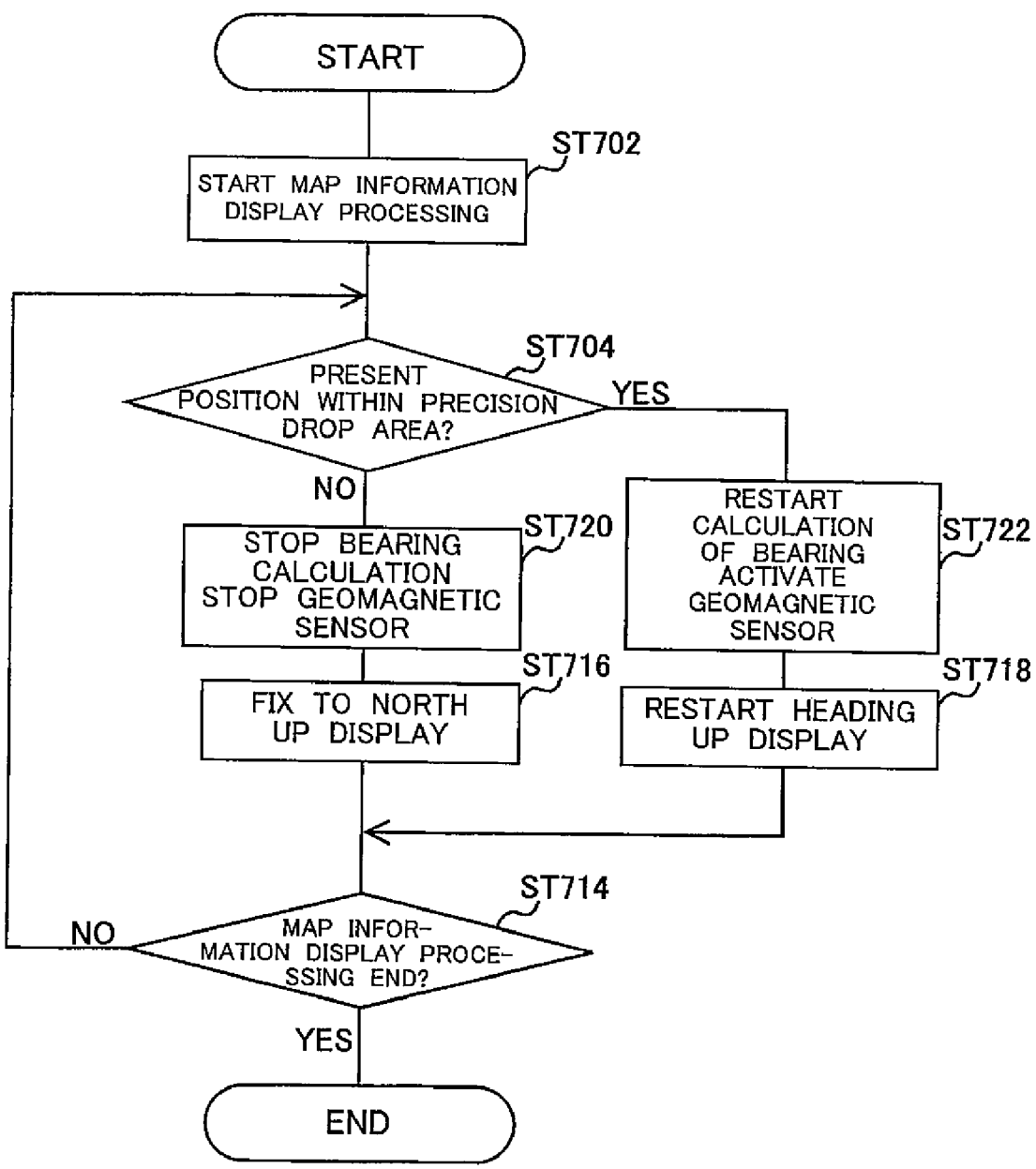
FIG. 30 is a flow chart illustrating a seventh example of processing in a case where an error occurs in a earth-geomagnetism detection value due to the influence of an external magnetic field.

The difference of FIG. 30 from FIG. 29 explained above resides in that when it is judged that the cellular phone 100 enters a precision drop area based on the information of the storage unit 152, the processing for calculation of the bearing and the operation of the geomagnetic sensor 158 are suspended, while when it is judged that the cellular phone 100 moves out of the precision drop area, these operations are restarted.

When judging at step ST704 that the present position of the cellular phone 100 is included in the precision drop area, the signal processing/control unit 160 fixes the display of the map from the heading up display to the north up display (ST716) and, at the same time, suspends the processing for calculation of the bearing and the operation of the geomagnetic sensor 158 (ST720). When it is judged at step ST704 that the present position moves out of the precision drop area, the signal processing/control unit 160 releases the north up display and restarts the heading up display (ST718) and, at the same time, restarts the calculation processing for the bearing and the operation of the geomagnetic sensor 158 (ST722).

As described above, according to the processing for the example shown in FIG. 30, the operation of the geomagnetic sensor 158 is suspended in an area where the precision of the information of the bearing is lowered due to the influence of an external magnetic field, therefore the wasted supply of electric power to the unused circuits is suppressed and a reduction of the power consumption can be achieved.

Next, an example of the processing in the case where error occurs in the earth-geomagnetism detection values due to the influence of an external magnetic field will be explained with reference to the flow chart shown in FIG. 31.

Figure 31:
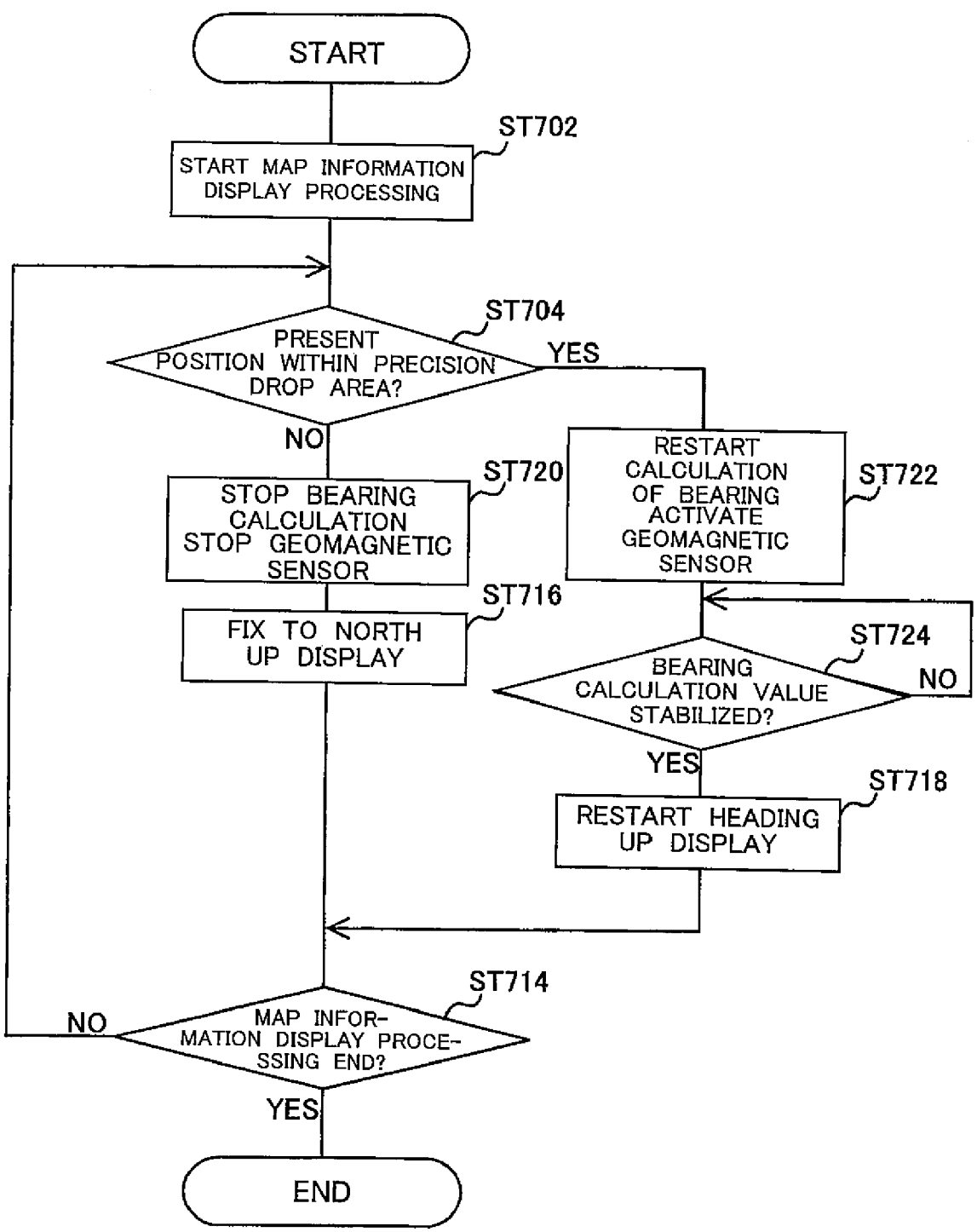
FIG. 31 is a flow chart illustrating an eighth example of processing in a case where an error occurs in a earth-geomagnetism detection value due to the influence of an external magnetic field.

The difference of FIG. 31 from FIG. 30 explained above resides in that the heading up display is restarted after the calculation value of the bearing is stabilized when it is judged that the cellular phone 100 moves out of the precision drop area.

After judging at step ST704 that the present position of the cellular phone 100 is out of the precision drop area and restarting the processing for calculation of the bearing and the operation of the geomagnetic sensor 158 (ST722), the signal processing/control unit 160 judges whether or not the calculation value of the bearing is stabilized (ST724). For example, the signal processing/control unit 160 judges that the calculation value of the bearing is stabilized when the extent of fluctuation in a predetermined time as the result of calculation of the bearing is contained within a predetermined range. Then, after judging that the calculation value of the bearing is stabilized, the signal processing/control unit 160 releases the north up display and restarts the heading up display (ST718).

As described above, according to the processing for the example shown in FIG. 31, when it is judged that the present position of the cellular phone 100 is out of the precision drop area, after confirming that the calculation value of the bearing is stabilized, the heading up display is restarted. For this reason, immediately after the present position moves out of the precision drop area, when the fluctuation of the earth-geomagnetism detection values due to a magnetic field from the building etc. remains, the low precision information of the bearing can be prevented from being displayed on the display unit 155.

Figure 32:
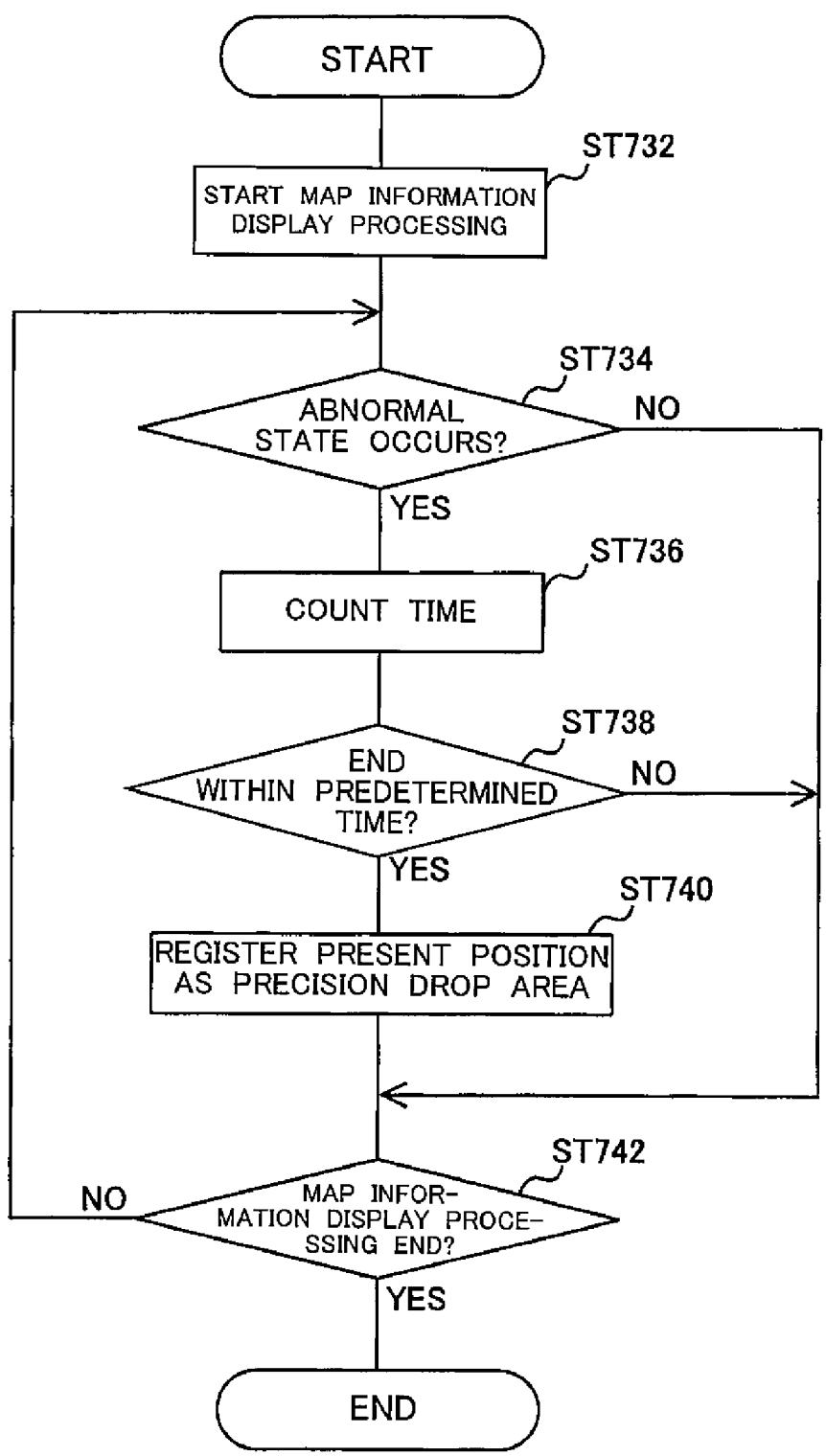
FIG. 32 is a flow chart illustrating an example of processing for registering a precision drop area in a storage unit in the processing shown in FIG. 28 to FIG. 31.

Next, the processing for registering a precision drop area in the storage unit 152 in the processing for the example (FIG. 28 to FIG. 31) of correcting the influence of an external magnetic field explained above will be explained with reference to the flow chart of FIG. 32.

When the start of the position finding processing is selected by a key input operation etc. at the key input unit 154 (ST732), the signal processing/control unit 160 checks whether or not the detection values of the geomagnetic sensor 158 become a predetermined abnormal state (ST734).

Here, the "predetermined abnormal state" is the same as for example that explained in the processing for correction of offset error of FIG. 20. Namely, the state where overflow occurs in any one of the 8 bits of detection values expressed by whole number values of from "0" to "255" and the state where any one of the earth-geomagnetism detection values is out of the predetermined normal range are detected as abnormal states.

When detecting such abnormal state of the earth-geomagnetism detection values, the signal processing/control unit 160 counts the time during which the abnormal state continues from the point of time of the detection (ST736). Then, when the abnormal state ends within a predetermined time (for example 5 seconds), the signal processing/control unit 160 judges that error occurs in the earth-geomagnetism detection values due to an external magnetic field (ST738) and registers the present position as a precision drop area in the storage unit 152 (ST740).

The precision drop area is registered in the storage unit 152 by storing the identification number of the map displayed when detecting an abnormality of the earth-geomagnetism detection values and the information of the coordinates on the map where the abnormality occurs (for example the coordinate range of the a few meters square region including the abnormality occurrence point) in correspondence in a predetermined precision drop area registration use data table assigned to the storage unit 152.

Note that an upper limit may be provided for the number of the precision drop areas registered in the storage unit 152. In this case, when the number of the precision drop areas registered in the storage unit 152 reaches this upper limit, the signal processing/control unit 160 may delete the oldest information from among the information of the already registered precision drop areas when registering a new precision drop area. Due to this, unlimited consumption of the storage region of the storage unit 152 by the registered information of the precision drop areas can be prevented and, at the same time, by leaving the newest information, the reliability of the information of the precision drop areas can be raised.

After registering a precision drop area in the storage unit 152, the signal processing/control unit 160 checks whether or not the end of the position finding processing is selected (ST742). When it confirms that the processing continues, it repeats the processing for steps ST734 to ST740 explained above.

Further, when the abnormal state of the earth-geomagnetism detection values is not detected at step ST734 or when it is judged at step ST738 that the abnormal state of the earth-geomagnetism detection values continues over a predetermined time or more, the signal processing/control unit 160 confirms the continuation of the position finding processing in the same way, then repeats the processing for steps ST734 to ST740.

Preferred embodiments of the present invention were explained above, but the present invention is not limited to only the above aspects and includes various variations.

In the above embodiments, an example of the processing for calculation of the bearing, an example of the processing for correction of offset error, and an example of the processing in the case where error occurred in the earth-geomagnetism detection values due to the influence of an external magnetic field were shown, but the embodiments of the present invention include all combinations of any of these processing examples.

In the above embodiments, the example of the detection of earth-geomagnetism in three directions in the geomagnetic sensor 158 was shown, but the present invention is not limited to this. For example, two directions are also possible.

In the above embodiments, in for example step ST208 of FIG. 14, the example of displaying a drop of the precision of the information of the bearing on the display unit 155 is shown, but the present invention is not limited to this. For example, when correcting the information of the bearing when for example this display is carried out, the fact of correction being in progress may be displayed on the display unit 155. Alternatively, information indicating both a drop of precision and correction in progress may be displayed on the display unit 155.

Further, the display of the information of the bearing may be simply stopped instead of displaying information such as the drop of precision or correction in progress. In this case, when the correction of the bearing is completed (or when the phone leaves the precision drop area), the restoration of the precision of the information of the bearing may be shown to the user by restarting the display of the information of the bearing.

At steps ST616 and ST618 of FIGS. 26 and 27, the fixing of the display to the north up display and the release thereof are carried out, but the present invention is not limited to this. The display of a drop of the precision of the bearing and the restoration of the precision of the bearing may be carried out in the same way as for example in steps ST608 and ST612 of FIG. 24.

At steps ST716 and ST718 of FIGS. 30 and 31, the fixing of the display to the north up display and the release thereof are carried out, but the present invention is not limited to this. The display of a drop of the precision of bearing and the restoration of the precision of the bearing may be carried out and in the same way as for example in steps ST708 and ST712 of FIG. 28.

In the example of the processing where error occurs in the earth-geomagnetism detection value due to the influence of an external magnetic field (FIG. 28 to FIG. 31), the information of the precision drop area is acquired from the data table of the storage unit 152, but the present invention is not limited to this. This information may be acquired from for example the server system connected via the wireless communication unit 150. Namely, the signal processing/control unit 160 acquires the information indicating whether or not the present position of the cellular phone 100 is included in the precision drop area from the predetermined server system via the wireless communication unit 150 and, where it is indicated in the acquired information that the present position is included in the precision drop area, may prohibit the processing for correction of offset error.

In the above embodiments, the processing for rotation of the map (for example heading up display) is carried out in the cellular phone 100, but the present invention is not limited to this. For example, the cellular phone 100 may designate the orientation of the map with respect to the navigation server system 402 and request the map information, and the navigation server system 402 may generate the map information in the orientation in response to the request from the cellular phone 100 and provide the same to the cellular phone 100. Namely, the signal processing/control unit 160 may perform the processing for acquiring the image information of the map in accordance with the bearing calculated based on the earth-geomagnetism detection values from the navigation server system 402 and displaying the same on the display unit 155. Then, during this processing, when a drop of the detection precision of the earth-geomagnetism detection values is detected by for example the level of the GPS signals becoming lower than a predetermined value, the signal processing/control unit 160 may request the image information of a map of a previously set bearing to the navigation server system 402 irrespective of the calculated bearing and acquire this and display the same on the display unit 155.

In the above embodiments, the processing for calculation of the location in accordance with the GPS signals is carried out in the GPS server system 401, but the present invention is not limited to this. The computation for finding the location from the GPS signals may be carried out in the cellular phone 100 as well.

In the above embodiments, the map information is acquired from the navigation server system 402, but the present invention is not limited to this. The map information may be stored in a storage device inside the cellular phone 100 as well.

In the above embodiments, an example where the processing for the signal processing/control unit 160 is executed based on a program by a computer is shown, but it is also possible to execute at least part of the processing not according to the computer, but by hardware.

Conversely, the processing for at least part of the units other than the signal processing/control unit 160 may be executed in the computer of the signal processing/control unit 160.

Further, the movable communication apparatus of the present invention is not limited to a mobile phone. For example, the present invention can be widely applied to communication devices which have communication functions and are movable and preferably portable, for example PDAs (personal digital assistants).

The invention claimed is:

1. A bearing calculator having
a geomagnetic sensor for detecting earth-geomagnetism and
a control unit for calculating a geographical bearing based on detection values of the geomagnetic sensor,
wherein
said control unit can execute a offset error correction processing for correcting offset error to said geomagnetic sensor due to a change of magnetic field in the bearing calculator and,
when detection values of said geomagnetic sensor become abnormal state, performs said offset error correction processing if the abnormal state continues for a predetermined time, and does not perform the offset error correction processing if the abnormal state ends within a predetermined time, wherein said geomagnetic sensor detects earth-geomagnetism in a plurality of mutually perpendicular directions, and
said control unit does not perform said offset error correction processing if said predetermined time is not required from when at least one of the detection values of the earth-geomagnetism in said plurality of directions becomes a predetermined abnormal state to when all of the detection values of the earth-geomagnetism in said plurality of directions are no longer in said abnormal state,
said geomagnetic sensor converts an analog signal of earth-geomagnetism to a digital signal and outputs it as a detection value of the earth-geomagnetism, and said predetermined abnormal state is a state where the detection value of said geomagnetic sensor becomes a maximum value or a minimum value of said digital signal,
said calculator is further provided with a display unit, and
said control unit calculates a geographical bearing based on detection values of said geomagnetic sensor and controls said display unit to display information of said calculated bearing.

2. A bearing calculator as set forth in claim 1, wherein said abnormal state is a state where the detection value of said geomagnetic sensor is outside a range determined as normal.

3. A bearing calculator as set forth in claim 1, wherein said control unit controls said display unit to display information showing that the precision of information of the bearing is low and/or processing for correction of said information of the bearing is being executed while performing offset error correction processing on the information of the bearing.

4. A bearing calculator as set forth in claim 3, wherein said control unit displays a pictograph indicating a specific bearing as said information of the bearing and makes the display mode of said pictograph different from the case where the state is not said abnormal state so as to show that the precision of information of the bearing is low and/or processing for correction of said information of the bearing is being executed.

5. A bearing calculator as set forth in claim 3, wherein said control unit makes said display unit display information showing that the precision of the information of the bearing has been restored and/or the offset error correction processing of the information of the bearing has been completed when the offset error correction processing of the information of the bearing has been completed.

6. A bearing calculator as set forth in claim 4, wherein said control unit makes the mode of display of said pictograph the same as the case where the state is not said abnormal state so as to show that the precision of the information of the bearing has been restored and/or the offset error correction processing of the information of the bearing has been completed when the offset error correction processing of the information of the bearing has been completed.

7. A bearing calculator as set forth in claim 1, wherein
said calculator has a position information acquiring unit for acquiring information relating to a geographical location of a current position, and
said control unit
performs first display processing for acquiring a peripheral map of a current position specified based on position information acquired at said position information acquiring unit and controlling rotation of the direction of said map on a display screen of said display unit in accordance with said calculated bearing and
performs second display processing for stopping said rotation control and fixing a predetermined bearing of said map at a predetermined direction on said display screen when detection values of said geomagnetic sensor enter said abnormal state and said abnormal state continues for said predetermined time during said first display processing.

8. A bearing calculator as set forth in claim 7, wherein said control unit restarts said rotation control when said offset error correction processing has been completed after stopping said rotation control.

9. An error correction method in a bearing calculator provided with a geomagnetic sensor for detecting earth-geomagnetism and a control unit for calculating a geographical bearing based on detection values of said geomagnetic sensor, comprising
an offset error correction processing step of correcting an offset error to said geomagnetic sensor due to a change of magnetic field in the bearing calculator;
an abnormal state detection step of detecting that detection values of said geomagnetic sensor become abnormal; and
a judgment step of judging whether or not an abnormal state continues for a predetermined time when the abnormal state is detected at said abnormal state detection step,
wherein
said offset error correction processing step is carried out when it is judged in said judgment step that said abnormal state continues for a predetermined time, while said offset error correction processing step is not carried out when it is judged that said abnormal state does not continue for said predetermined time, wherein said geomagnetic sensor detects earth-geomagnetism in a plurality of mutually perpendicular directions, and
said control unit does not perform said offset error correction processing if said predetermined time is not required from when at least one of the detection values of the earth-geomagnetism in said plurality of directions becomes a predetermined abnormal state to when all of the detection values of the earth-geomagnetism in said plurality of directions are no longer in said abnormal state, said geomagnetic sensor converts an analog signal of earth-geomagnetism to a digital signal and outputs it as a detection value of the earth-geomagnetism, and
said predetermined abnormal state is a state where the detection value of said geomagnetic sensor becomes a maximum value or a minimum value of said digital signal, said calculator is further provided with a display unit, and
said control unit calculates a geographical bearing based on detection values of said geomagnetic sensor and controls said display unit to display information of said calculated bearing.

* * * * *